United States Patent
Kanekawa et al.

(10) Patent No.: US 6,600,295 B2
(45) Date of Patent: Jul. 29, 2003

(54) ELECTRIC POWER CONVERTER WITH CONTINUOUS STABLE NOISE REDUCTION

(75) Inventors: Nobuyasu Kanekawa, Hitachi (JP); Kohei Sakurai, Hitachi (JP); Kenji Tabuchi, Hitachinaka (JP); Mitsuru Watabe, Urizura (JP); Shoji Sasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/943,386

(22) Filed: Aug. 31, 2001

(65) Prior Publication Data

US 2002/0149351 A1 Oct. 17, 2002

(30) Foreign Application Priority Data

Feb. 26, 2001 (JP) ........................................ 2001-049801

(51) Int. Cl.[7] ................................................. G05F 1/10
(52) U.S. Cl. ........................................ 323/222; 323/283
(58) Field of Search ................................ 323/222, 283, 323/284, 285, 288; 307/10.6

(56) References Cited

U.S. PATENT DOCUMENTS

| | | | |
|---|---|---|---|
| 5,416,481 A | 5/1995 | Chen | 341/131 |
| 5,640,315 A | 6/1997 | Hirano et al. | 363/41 |
| 5,982,156 A * | 11/1999 | Weimer et al. | 307/18 |
| 6,166,527 A * | 12/2000 | Dwelley et al. | 323/222 |
| 6,178,104 B1 * | 1/2001 | Choi | 323/222 |
| 6,198,264 B1 * | 3/2001 | Nagaya et al. | 323/222 |

FOREIGN PATENT DOCUMENTS

JP    7-264849    10/1995

OTHER PUBLICATIONS

Random–Switching Control in DC–To–DC Converters; Tetsuro Tanaka etal, 1989 IEEE, Jun. 1989; pp. 270–277.

* cited by examiner

*Primary Examiner*—Shawn Riley
(74) *Attorney, Agent, or Firm*—Crowell & Moring LLP

(57) ABSTRACT

In order to ensures a stable reduction of noise level at all times, in the steps of switching input voltage with a switching element 10, smoothing the voltage of rectangular wave obtained by switching with a reactor L and capacitor Cf and outputting it, the voltage obtained by dividing the output voltage is compared with the sawtooth wave output from a sawtooth wave generator 14 by a comparator 12. When the switching signal in response to the result of this comparison is applied to the switching element 10, the counter 16 is actuated synchronously with the vertex of the sawtooth wave to perform opening/closing operation of the switch SW1. The time constant of the time constant circuit comprising a R0 and C is adjusted according to whether a resistor R1 is present or not, and the signals of frequencies f1 and f2 coming out of the sawtooth wave generator 14 are sequentially switched to be sent to the comparator 12. The peak of the switching noise is diffused in the frequency range by sequential selection of switching frequencies, and noise level is reduced by diffusion of noise energy.

26 Claims, 29 Drawing Sheets

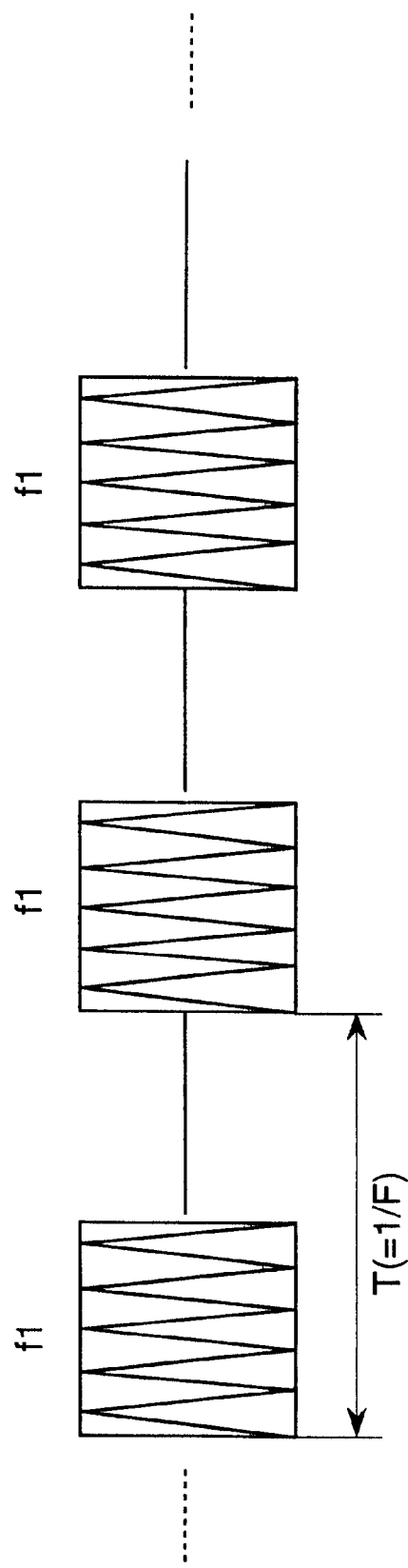 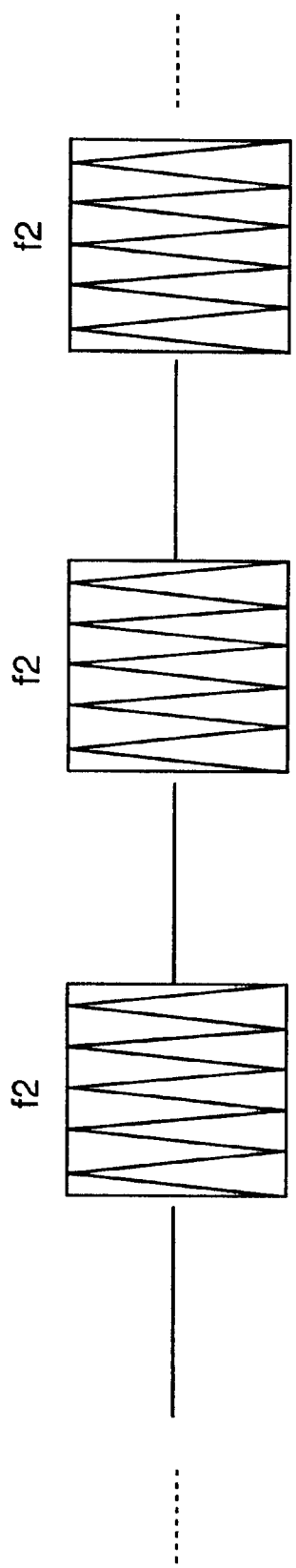

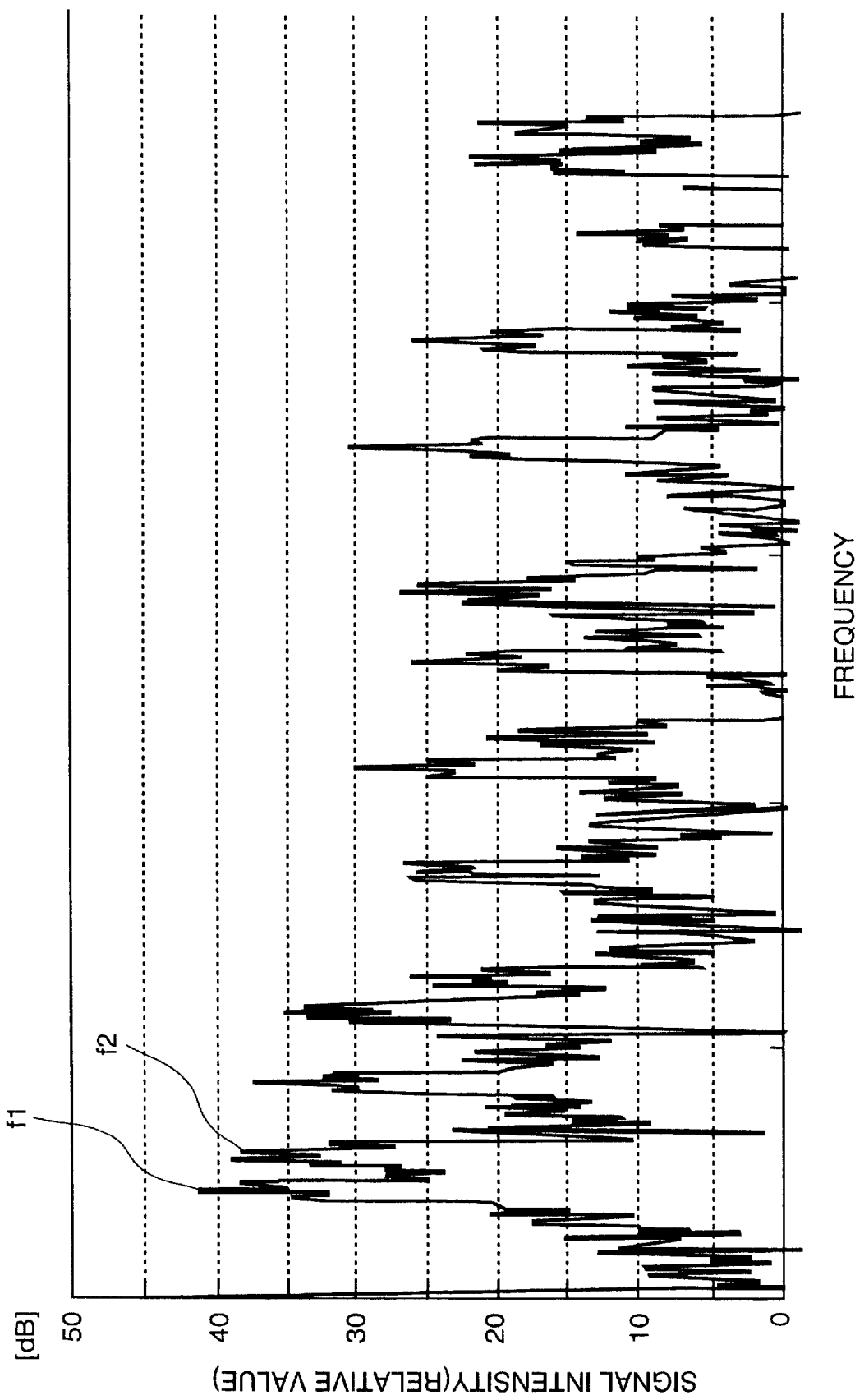

ELECTRIC POWER CONVERTER WITH CONTINUOUS STABLE NOISE REDUCTION

BACKGROUND OF THE INVENTION

The present invention relates to an electric power converter and particularly to the electric power converter which is suitably used as a DC—DC converter or switching regulator through switching of input voltage.

A regulator based on voltage drop was used to supply stable d.c. voltage to the load in an electronic apparatus or the like in the prior art. This regulator, however, features a poor power efficiency and produces much heat. To solve this problem, a switching regulator is often used instead of the regulator based on voltage drop.

The switching regulator causes the switch element to be switched at a high frequency, thereby ensuring excellent power efficiency and smaller heat generation. In the switching regulator, however, the switch noise produced in the switching of a switching element may affect the electronic apparatus as a load and peripheral equipment. Especially, an electronic apparatus with higher density tends to be more seriously affected by switching noise.

As disclosed in the references (Tetsuo Tanaka, et al. "Random Switching Control in DC-to-DC Converters", Proc. of IEEE Power Electronics Specifications Conference, PESC '89 (June 1989), the following method is proposed to reduce switching noise: The switching frequency is converted at random and the peak of the switching noise is diffused in the frequency range, thereby reducing the noise level. A specific method of embodying this reference is disclosed, for example, in Japanese Patent Laid-Open NO. 264849/1995.

According to the prior art introduced above, the peak of the switching noise is diffused in the frequency range. This allows noise energy to be diffused and the noise level to be reduced.

In the prior art, however, use of a simple circuit for embodiment is not sufficiently taken into account. The prior art requires use of a "noise generator" or "random signal generation circuit", but does not disclose a method for embodying them. It can be inferred that a great area is required because the random signal generation circuit is an analog circuit. Moreover, the noise of the switching regulator itself may give a serious influence. Since the switching frequency is selected at random, noise generation greatly depends on the characteristics of the switching signal occurring at random. This effect is probabilistic but not deterministic. A satisfactory effect cannot be expected at all times.

SUMMARY OF THE INVENTION

The object of the present invention is to provide an electric power converter which ensures a stable reduction of noise level at all times.

For this purpose according to the invention, in the steps of switching input voltage with a switching element 10, smoothing the voltage of rectangular wave obtained by switching with a reactor L and capacitor Cf and outputting it, the voltage obtained by dividing the output voltage is compared with the sawtooth wave output from a sawtooth wave generator 14 by a comparator 12. When the switching signal in response to the result of this comparison is applied to the switching element 10, the counter 16 is actuated synchronously with the vertex of the sawtooth wave to perform opening/closing operation of the switch SW1. The time constant of the time constant circuit comprising a R0 and C is adjusted according to whether a resistor R1 is present or not, and the signals of frequencies f1 and f2 coming out of the sawtooth wave generator 14 are sequentially switched to be sent to the comparator 12. The peak of the switching noise is diffused in the frequency range by sequential selection of switching frequencies, and noise level is reduced by diffusion of noise energy.

A first embodiment of the electric power converter according to the invention includes a signal generator for generating multiple signals having different frequencies, a signal selecting means for selecting signals of specified frequency from the multiple signals and outputting the signals sequentially in a predetermined order, a switching element for switching input voltage in response to signals selected by said signal selecting means, and a filter circuit for smoothing the output voltage of said signal generator. In this case, signals of rectangular waves having different periods can be used as multiple signals generated from the signal generator.

A second embodiment of the electric power converter according to the invention includes a switching element for switching input voltage in response to switching signals, a filter circuit for smoothing the output voltage of said switching element, a signal generator for generating multiple signals having different frequencies, a signal selecting means for selecting signals of specified frequency from the multiple signals and outputting such signals sequentially in the predetermined order, and a comparator which compares between signals selected by said signal selecting means and feedback signals obtained from the output voltage of said filter circuit, thereby generating switching signals and outputting them to said switching element.

According to the above-mentioned embodiment, signals of specified frequency are selected from multiple discrete signals sequentially in the predetermined order in the step of switching the input voltage by a switching element, and the switching element performs switching operation in response to the signals of selected frequency. This allows the peak of the switching noise to be diffused in the frequency range, and noise energy to be diffused, thereby ensuring a stable reduction of noise level at all times.

The following variations can be added when the above-mentioned electric power converter is configured:

(1) Above-mentioned multiple signals generated from the signal generator may be the signals characterized by waveforms having a certain slope.

(2) Above-mentioned multiple signals generated from the signal generator may be the signals characterized by sawtooth waveforms.

(3) Above-mentioned multiple signals generated from the signal generator are the signals characterized by triangular waveforms.

(4) The above-mentioned signal selecting means selects the signals generated from the signal generator according to the vertex of the waveform.

(5) The above-mentioned signal selecting means selects out of the signals generated from the signal generator the signals in the order from lower to higher frequencies, and then selects the signals in the order from higher to lower frequencies.

(6) The signal generator and signal selecting means may include a waveform generator for generating signals of triangular waveform and sawtooth wave, a time constant circuit for determining the period of the signals generated from the waveform generator according time constant, multiple resistors for changing the time constant, a counter which counts the signals generated from the waveform generator, compares the counted value with the preset value and outputs the switching signals synchronously with the vertex of the waveform of the signals based on the compared result, and multiple switch for adding the specified ones of the multiple resistors to the time constant circuit in response to the switching signals.

(7) Alternatively, in place of the counter, the generator and signal selecting means may include a random number generator for outputting the switching signals synchronously with the vertex of the waveform of the signals generated from the waveform generator.

(8) The above-mentioned counter may be a binary counter.

(9) The above-mentioned waveform generator, comparator, multiple switches and counter may be arranged on a single semiconductor chip.

(10) The above-mentioned waveform generator, comparator, multiple resistors, multiple switches and counter may be arranged on a single semiconductor chip.

(11) The above-mentioned waveform generator, comparator, multiple switches and random number generator may be arranged on a single semiconductor chip.

(12) The above-mentioned waveform generator, comparator, multiple resistors, multiple switches and random number generator may be arranged on a single semiconductor chip.

(13) Multiple resistors and multiple switches are each connected in series, and resistors and switches connected in series may each be connected with others in parallel.

(14) The resistance of each of the above-mentioned resistors may be different from the parallel combined resistance of other resistors connected in parallel.

(15) The resistance Ri of each of the above-mentioned resistors has a relationship of $Ri=Kr.2^{-i}$.

(16) The above-mentioned signal generator consists of a frequency divider for dividing the original frequency.

(17) A transformer is provided between the switching element and filter circuit.

(18) The above-mentioned filter circuit has a reactor and capacitor, one end of the reactor is connected to the input side, and the other end of the reactor is connected to the ground via the capacitor as well as via the switching element.

When a binary counter is used as a counter, the space can be saved since the binary counter is made of a digital circuit. The multiple resistors added to the time constant circuit can be used as binary ladders. The binary ladder can represent $2^m$ a resistances (a m-th power of 2) with "m" resistors, thereby downscaling the circuit. Thus, use of the binary counter and binary ladder allows configuration of a simple circuit, especially, configuration of a circuit suited to the formation of an integrated circuit.

BRIEF DESCRIPTION OF THE DRAWINGS

FIG. 6 is a waveform diagram representing how to derive the spectrum given in FIG. 5;

FIG. 7 is a waveform diagram representing the spectrum by FFT;

DETAILED DESCRIPTION OF THE PREFERRED EMBODIMENTS

Figure 1:
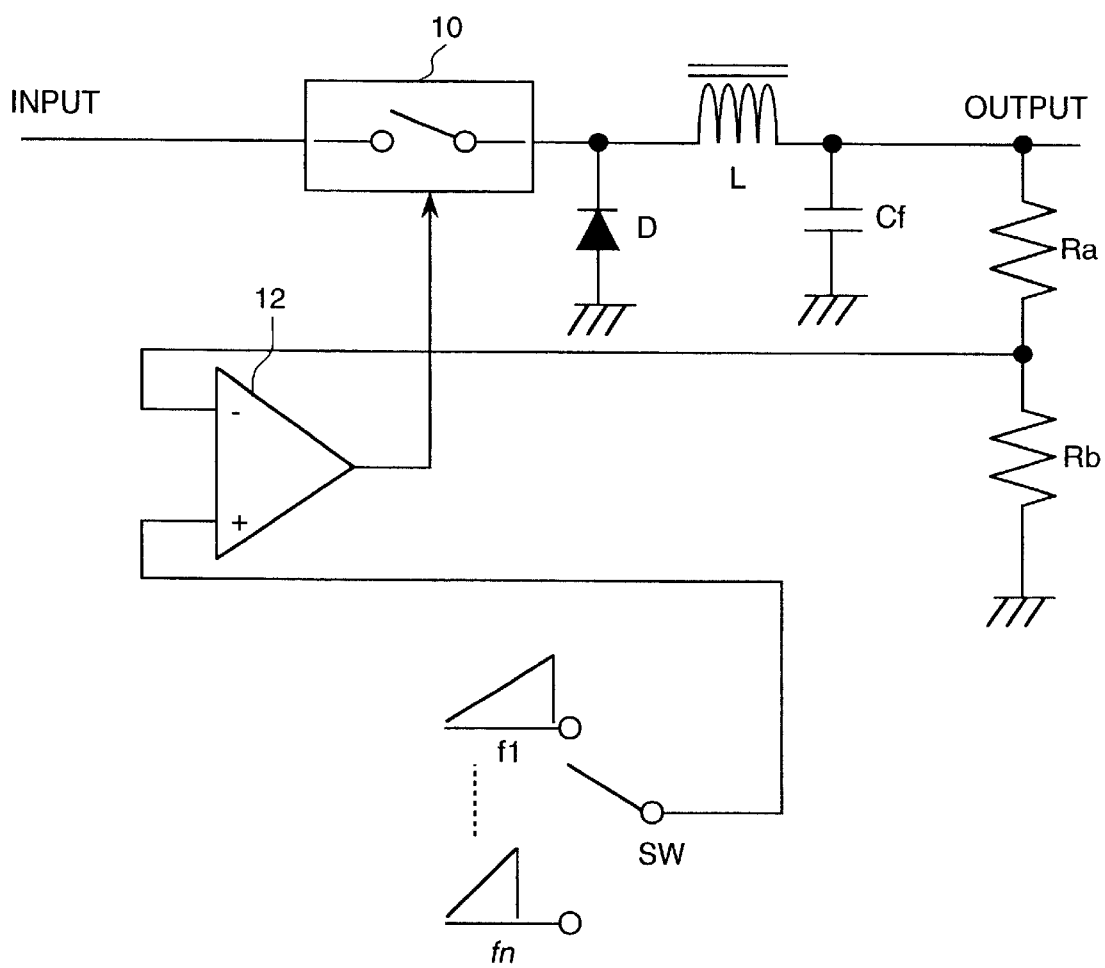
FIG. 1 is a circuit diagram representing the first embodiment of a voltage drop type switching regulator according to the present invention.

The following describes an embodiment according to the present invention with reference to drawings: FIG. 1 is a circuit configuration diagram of the electric power converter representing a first embodiment of the present invention. In FIG. 1, the electric power converter according to the present embodiment as a voltage drop type switching regulator comprises a switching element 10, comparator 12, free wheel diode D, reactor L, capacitor Cf, resistors Ra and Rb, and switch SW. Switching operation is performed by sequential switching of multiple discrete frequencies f1 to fn by sawtooth wave.

The switching element 10 consists of a transistor, FET, IGBT and other semiconductors, for example. and the input voltage (d.c. voltage) is switched in response to switching signal. The input voltage is converted into the rectangular wave voltage by switching and is output to the side of reactor L. The reactor L and capacitor Cf form a low path filter to remove the switching noise contained in the output voltage of switching element 10, thereby allowing only the d.c. component to pass by. Namely, the reactor L and capacitor Cf are configured to have the function of a filter circuit for smoothing the output voltage of the switching element 10.

The output voltage of the low path filter is divided by resistors Ra and Rb constituting the voltage divider. The divided voltage is input into the negative input terminal of the comparator 12 as a feedback signal. Signals selected by switch SW are input to the positive input terminal of the comparator 12. The switch SW as a signal selecting means is connected to the signal generator (not illustrated) for generating signals of sawtooth waveform at frequencies f1 to fn. Out of multiple signals, signals having a specified frequency are selected sequentially in the predetermined order, and selected signals are sent to the comparator 12.

Comparator 12 compares between the feedback signal from the voltage divider and signals selected by switch SW, and PWM (pulse width modulation) control signals in response to the result of comparison are sent to the switching element 10 as switching signals. Then switching operation of switching element 10 is performed by switching signals. In this case, feedback signals of d.c. voltage and signals of sawtooth waveform are compared by the comparator 12, and PWM (pulse width modulation) control signals are changed in response to the result of comparison. For example, when the feedback signal level is increased, the pulse width is reduced. Conversely, when the feedback signal level is decreased, the pulse width is increased. Switching element 10 performs switching operation in response to switching signals with changing pulse width, with the result that the output voltage of the low path filter is controlled to a constant level at all times.

According to the present embodiment, multiple signals having a different period or frequency are switched in an predetermined order. This allows the peak of the switching noise to be diffused in the frequency range, and noise energy to be diffused, thereby reducing the noise level. Moreover, it ensures a stable reduction of noise level at all times.

When the order of selecting the signals with different frequencies is set, the switching noise is measured when each frequency is selected. This measurement provides a basis for setting a selection pattern in conformity to reduced noise.

A wave generator for generating signals having a certain tilt, for example, a triangular wave generator for producing triangular waves can be used as a signal generator, instead of a signal generator generating a sawtooth waveform.

Figure 2:
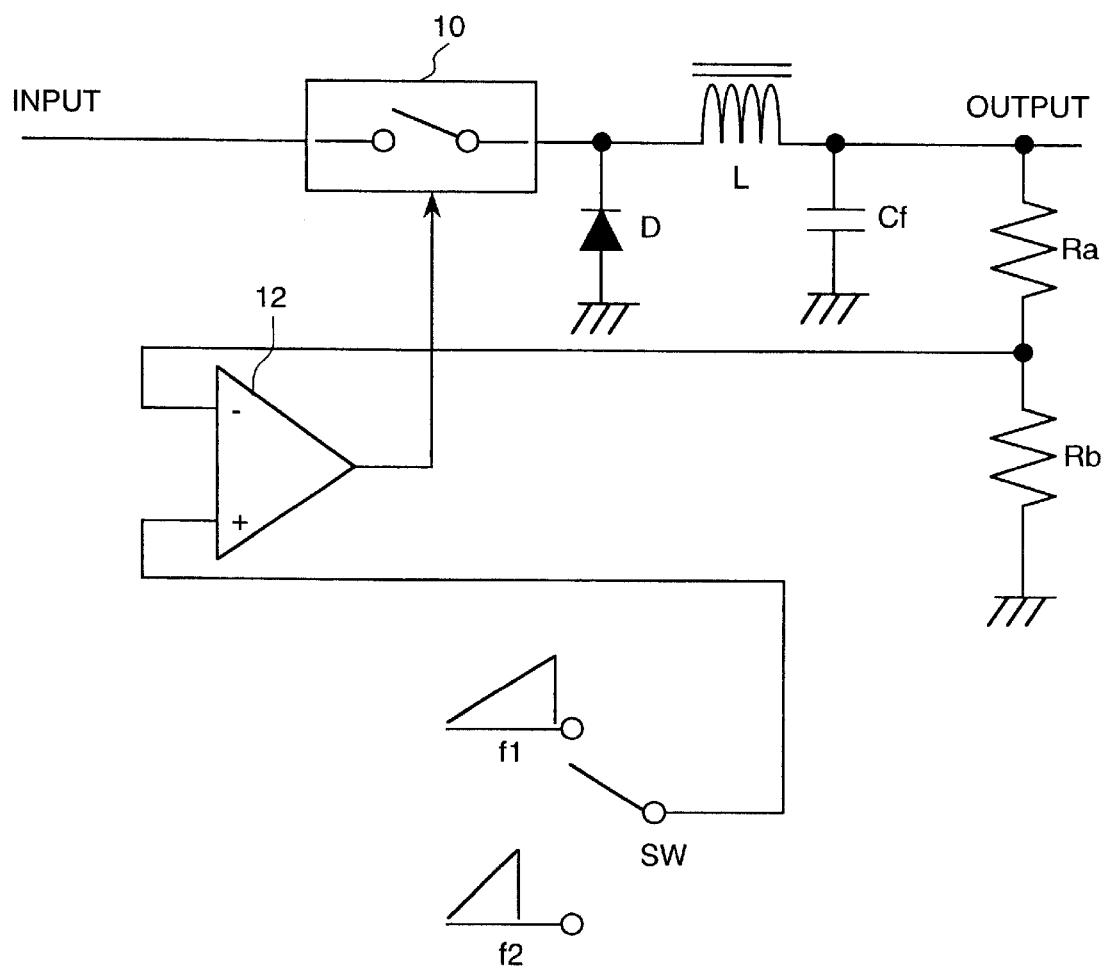
FIG. 2 is a circuit diagram representing the second embodiment of a voltage drop type switching regulator according to the present invention.

The following describes another embodiment according to the present invention with reference to FIG. 2. According to the present embodiment, switching operation is provided by switching of the signals of sawtooth waveform at two discrete frequencies f1 and f2. Other configuration characteristics are the same as those shown in FIG. 1. In this case, a circuit structure (a third embodiment) shown in FIG. 3 can be used for implementation of a signal generator for producing signals of sawtooth waveform at frequencies f1 and f2 and a signal selecting means for selecting two signals produced from this signal generator.

In other words, a sawtooth wave generator 14 and a counter (binary counter) 16 are connected as a signal generator and signal selecting means to the positive input end of the comparator 12.

The signals of sawtooth waveform at two discrete frequencies f1 and f2 are output to the counter 16 and comparator 12 by the sawtooth wave generator 14 as a waveform generator. In this case, signals having different frequencies and periods are generated from from the sawtooth wave generator 14, so sawtooth wave generator 14 is provided with resistors R0 and R1, switch SW1 and capacitor C. Resistor R0 and capacitor C are designed as a time constant circuit to determine the period or frequency of the signals produced from sawtooth wave generator 14 according to the time constant. To change the time constant, the resistor R1 is provided in parallel through resistor R0 and switch SW1.

Figure 4:
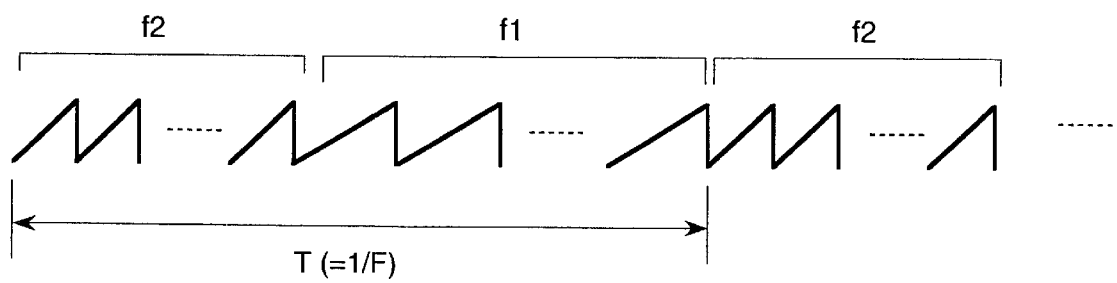
FIG. 4 is a diagram representing sawtooth waveforms.

Of the time constants C and R which determine frequencies f1 and f2 of the sawtooth waves produced from the sawtooth wave generator 14, the time constant R is set by the resistors R0 and R1 and switch SW. The sawtooth wave frequency is switched according to whether the switch SW21 is opened or closed. For example, the sawtooth wave of the frequency corresponding to time constants C and R0 is selected when the switch SW1 is open. When the switch SW1 is closed, the sawtooth wave of the frequency corresponding to time constants C and 1(1/R0+1/R1) is selected. Signals of sawtooth waveform at frequencies f1 and f2 are produced sequentially by the selection of switch SW1, as illustrated in FIG. 4. In this case, the switch SW1 is opened or closed by the output pulse of the counter 16. The counter 16 counts the signals generated from the sawtooth wave generator 14 and compares this count with the preset value. Then the switch SW1 is selected according to the result of this comparison.

Furthermore, the counter produces pulses as switching signals synchronously with the vertex of the waveform of the signals generated from the waveform generator 14. In other words, the output voltage will fluctuate if the switch SW1 is changed in the middle of a sawtooth wave. To ensure that the tilt of sawtooth wave does not change in the middle, the switch SW1 is designed to open or close at the vertex of the sawtooth wave (i.e. at the maximum or minimum point of the wave), not in the middle of the sawtooth wave. Accordingly, when the sawtooth wave which rises at a certain tilt with the lapse of time is used, the counter 16 operates at the fall of the sawtooth wave. Accordingly, the fluctuation of switching regulator output voltage can be avoided by ensuring the switch SW1 is opened or closed at the vertex of the sawtooth wave.

When the triangular wave is used instead of a sawtooth wave, the switch SW1 should be opened or closed at the vertex of the sawtooth wave, namely, at the maximum or minimum point of the wave. The triangular wave generator for producing triangular waves is normally implemented by repeating the waveform which has reached the preset threshold value (the upper and lower limit values of the waveform) (namely by switching between electric charging and discharging into the capacitor at a constant current). Capacitor discharging is switched to charging when the voltage has reached the lower limit value of the waveform in the process of capacitor discharging. Capacitor charging is switched to discharging when the voltage has reached the upper limit value of the waveform in the process of capacitor charging. Thus, the opening/closing operation of the switch SW1 can be carried out at the vertex of the sawtooth wave, if the counter 16 is operated at the time of having reached the threshold value (upper or lower value of the waveform) where the waveform value is preset on the basis of the result of comparison with the threshold value preset on the triangular wave generator.

In the above-mentioned embodiment, capacity value is changed by the opening/closing operation of the switch SW1, and is change the frequency. However, it is also possible to change the capacity value by opening/closing operation of the switch SW1, whereby the frequency is changed. From the view point of price, however, the capacitor price is higher than that of the resistor. Thus, switching of the resistance value by opening/closing operation of the switch is more ecumenical than changing of the capacity value by switching multiple capacitors.

According to the present embodiment, switching operation is performed by switching the signals of two periods or frequencies in the preset order. This allows the peak of the switching noise to be diffused in the frequency range, and noise energy to be diffused, thereby reducing the noise level. Moreover, it ensures a stable reduction of noise level at all times.

Figure 5:
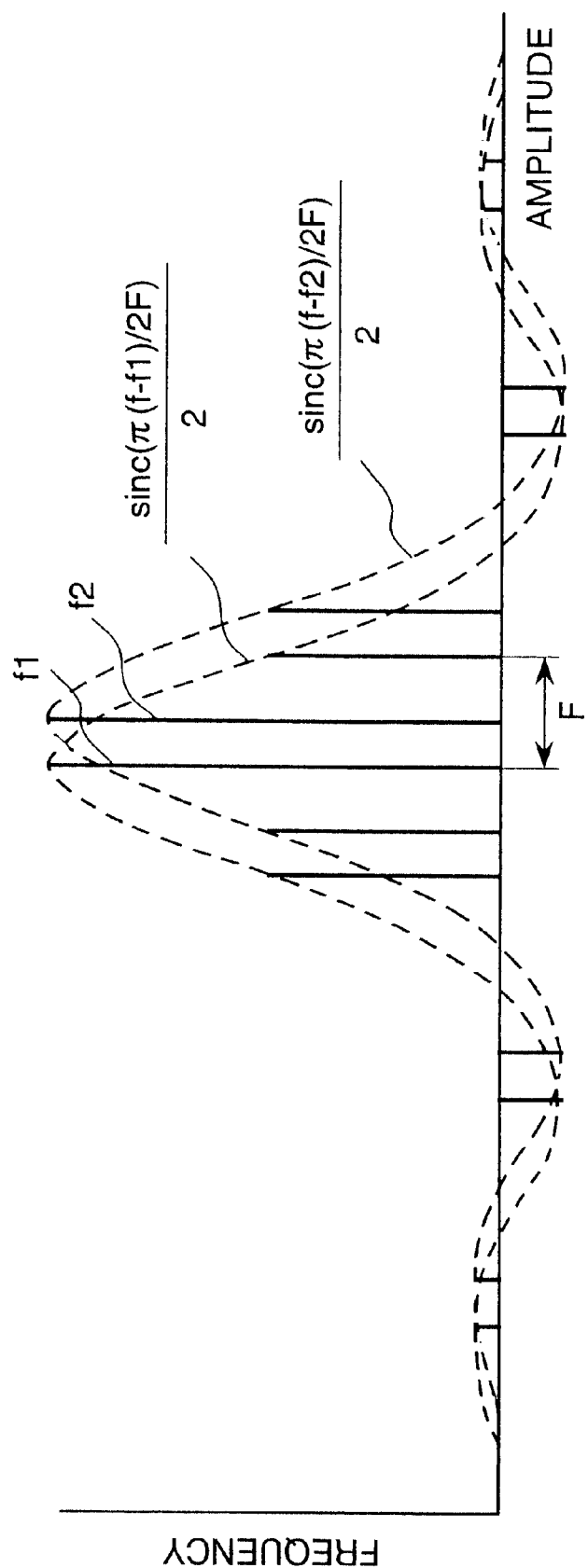
FIG. 5 is a waveform diagram representing the spectrum when two frequencies are used.

Here the inventors of the present invention have made an algebraic calculation to get the frequency spectrum in the present embodiment, and have obtained the switching waveform as shown in FIG. 5. In this case, they try to derive the spectrum when two frequencies f1 and f2 are periodically switched as shown in FIG. 4. In the derivation of this spectrum, they make efforts to obtain the enveloping spectrum in order to generate overlapped waveforms of various signals in the event of alternate generation of signals of frequencies f1 and f2 at period T at a burst, as shown in FIGS. 6(a) and (b). In this case, the envelope is a periodic function, and can be expressed by the following series:

$$a(t) = \sum_{k=-\infty}^{\infty} Ck \cdot e^{j2\pi kFt} \quad [\text{Eq. 1}]$$

where $$Ck = \frac{1}{To} \int_{-To/2}^{To/2} a(t) \cdot e^{-j2\pi kFt} dt \quad [\text{Eq. 2}]$$

$$= \frac{1}{To} \int_{-To/4}^{To/4} 1 \cdot e^{-j2\pi kFt} dt$$

$$= \frac{1}{2} \text{sinc}(k\pi/2)$$

where $\text{sinc}(\cdot) = \sin(\cdot)/\cdot$

Thus, the [Eq. 3] can be obtained from [Eq. 1]:

$$a(t) = \frac{1}{2} \sum_{k=-\infty}^{\infty} \text{sinc}(k\pi/2) \cdot e^{j2\pi kFt} \quad [\text{Eq. 3}]$$

Since Fourier transform of $\delta(t-t_o)$ is $\exp(-j2\pi kft_o)$, Fourier transform of a(t) is given by duality as followed:

$$A(f) = \frac{1}{2} \sum_{k=-\infty}^{\infty} Ck \cdot \delta(kF - f) \quad [\text{Eq. 4}]$$

$$= \frac{1}{2} \sum_{k=-\infty}^{\infty} \text{sinc}(k\pi/2) \cdot \delta(kF - f)$$

For simplicity, the following describes only the fundamental wave component of the waveform spectrum in FIG. 6(a), ignoring the high frequency component. In the area of f>0;

$$A1(f) = \frac{1}{2} \sum_{k=-\infty}^{\infty} \text{sinc}(k\pi/2) \cdot \delta(f1 - kF - f) \quad [\text{Eq. 5}]$$

Similarly, the waveform spectrum of FIG. 6(b) is given by the following equation:

$$A2(f) = \frac{1}{2} \sum_{k=-\infty}^{\infty} \text{sinc}(k\pi/2) \cdot \delta(f2 - kF - f) \quad [\text{Eq. 6}]$$

Thus, the waveform spectrum of FIG. 4 can be expressed as A1(f)+A2(f). The switching waveform is as shown in FIG. 5.

For simplicity, the spectrum of only the fundamental wave is obtained in FIG. 5. It can be inferred that the harmonic wave has the similar trend. For the harmonic wave, combinations of an enormous amount of frequency components must be taken in account. Since it is difficult to get the result by algebraic calculation, the inventors of the present invention use the numerical analysis (FFT: Fast Fourier Transform) to get it. FIG. 7 shows the result of FFT of the switching waveform (rectangular wave at 30% duty ratio) under the conditions of "f2=1.4f1, T=8 periods of sawtooth wave". The frequency in FIG. 7 indicates the value obtained by normalizing the measured frequency by means of switching frequency.

FIG. 5 shows that expansion on the frequency axis of the spectrum is proportional to F, but the amplitude of each sideband component does not change. In other words, the effect of reduction in the peak of the spectrum distribution appears independent of F. According to the present embodiment shown in FIG. 3, however, the frequency is switched synchronously with sawtooth waveform, so a relationship F=f1/n or F=f2/n holds.

Accordingly, when consideration is given to the i-th degree harmonic wave of f1 and f2, the frequency of the n-th sideband, namely, the frequency of the sideband away nF from the i-th degree harmonic wave agrees with that of the (i-1)-th or (i+1)-th harmonic wave component, with the result that the effect of spectrum diffusion is reduced. This reveals that a greater effect is obtained as the "F" is lower, namely, as "n" is greater. This trend is made clear by FFT analysis. It indicates that the peak of the spectrum distribution is lower as "n" is increased. As shown in FIG. 7, however, the effect of lowered spectrum peak reaches the point of saturation when "n" is in the range from about 4 to 8. No further improvement cannot be observed. As shown in FIG. 5, the amplitude of the component at the center of frequencies f1 and f2 is the biggest. This is because it is constant independently of "F", i.e., "n".

Figure 3:
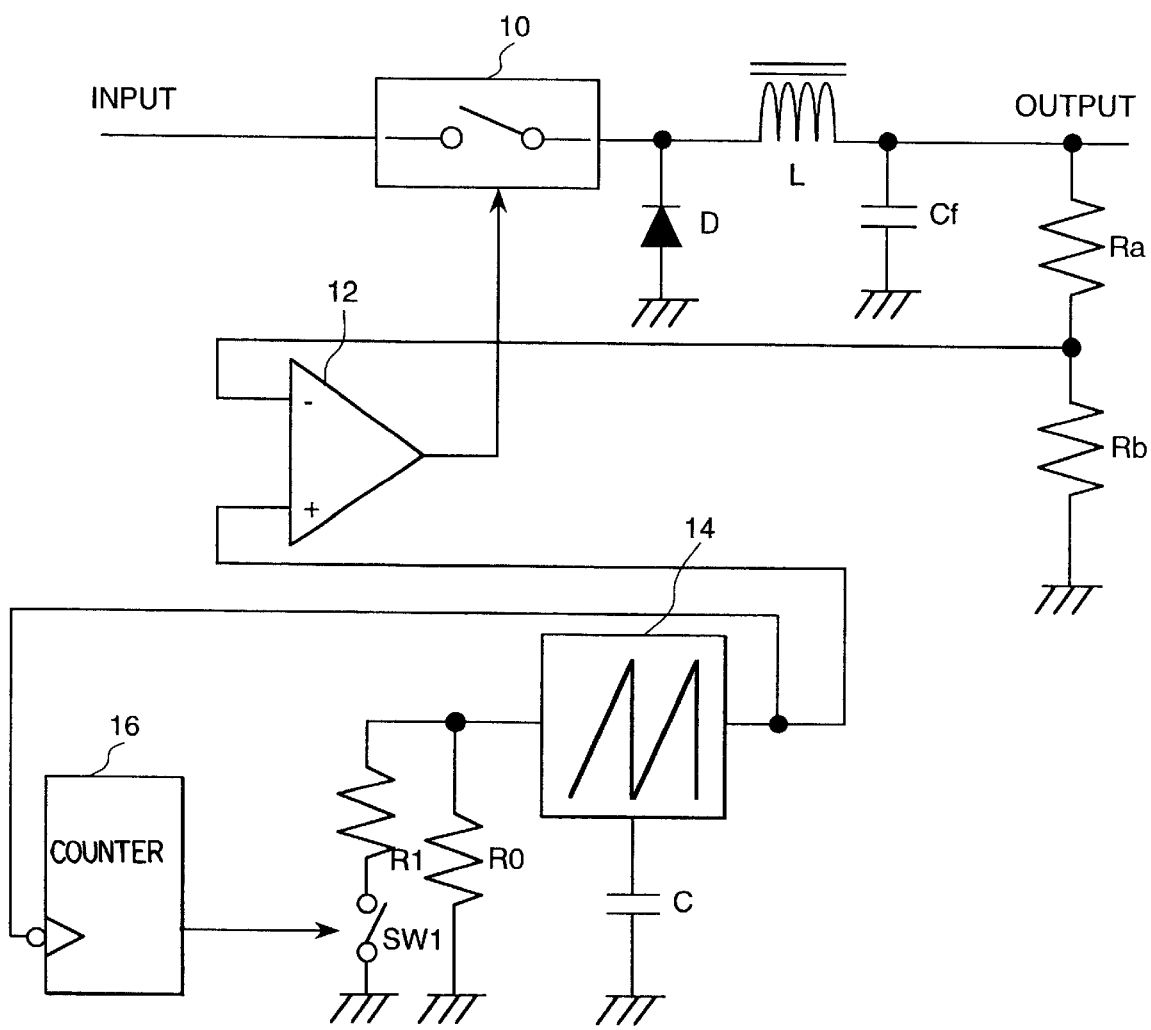
FIG. 3 is a circuit diagram representing the third embodiment of a voltage drop type switching regulator according to the present invention.

As discussed above, the present embodiment allows the amplitude of the switching noise to be reduced or eliminated by spreading the spectrum of the switching noise generated from the switching regulator and by diffusing the energy of noise, even when a simple circuit configuration shown in FIG. 3 is used.

Figure 8:
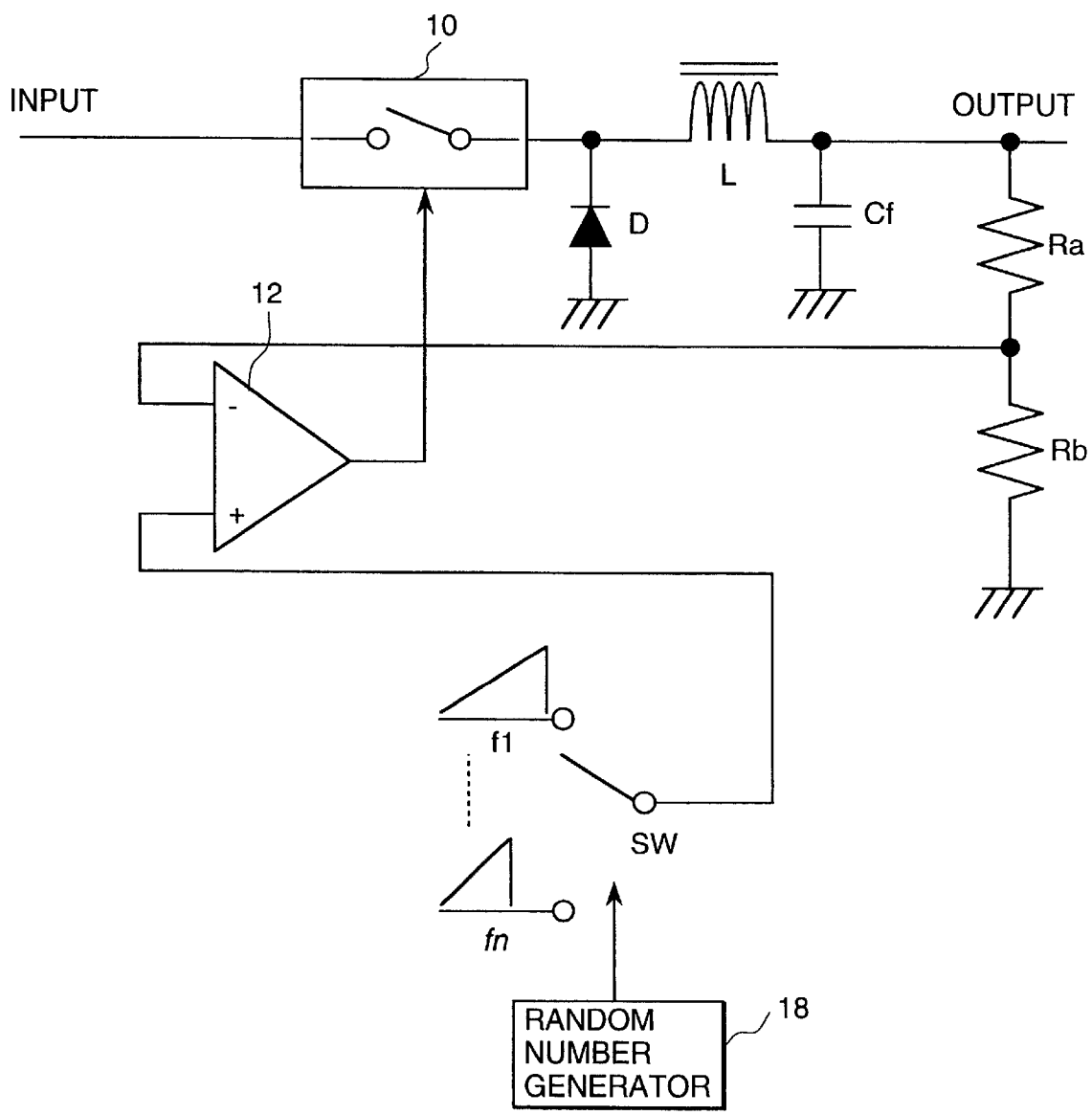
FIG. 8 is a circuit diagram representing the fourth embodiment of a voltage drop type switching regulator according to the present invention.

The following describes the fourth embodiment of the present invention with reference to FIG. 8: In this embodiment, the signals of sawtooth waveform having multiple discrete frequencies f1 to fn are switched by signals from the random number generator 18. The switching operation of the switch SW is performed by the random number generator 18. Otherwise, this embodiment is the same as shown in FIG. 1.

This embodiment provides the same effect of the first embodiment, and allows the switch SW to be changed in a desired order by the random number generator 18.

Figure 9:
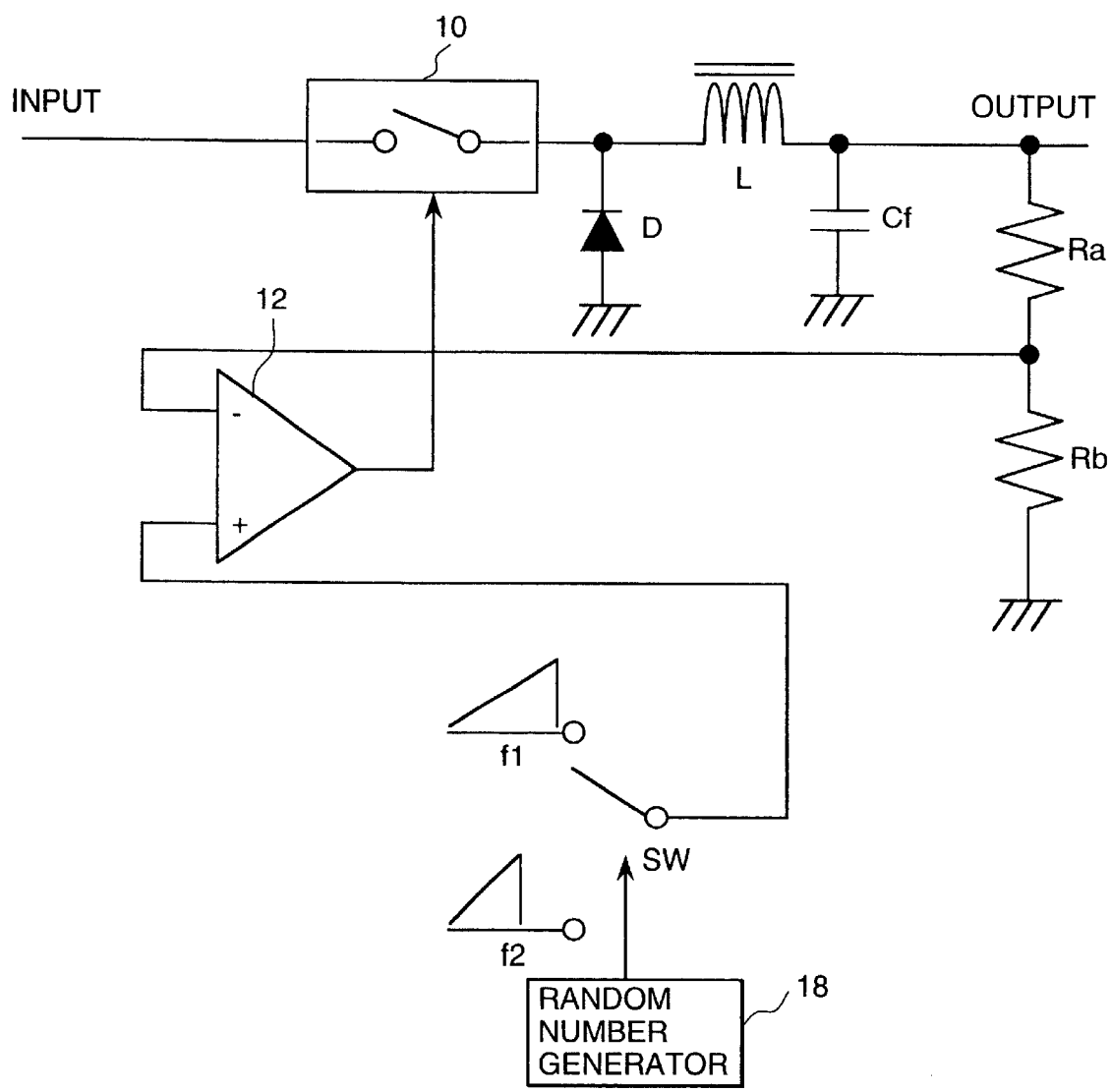
FIG. 9 is a circuit diagram representing the fifth embodiment of a voltage drop type switching regulator according to the present invention.

The following describes the fifth embodiment of the present invention with reference to FIG. 9:

In this embodiment, the switch SW is changed by the signals sent from the random number generator 18 in order to select the signals of sawtooth waveform having two discrete frequencies f1 and f2. Otherwise, it is the same as shown in FIG. 2.

Figure 10:
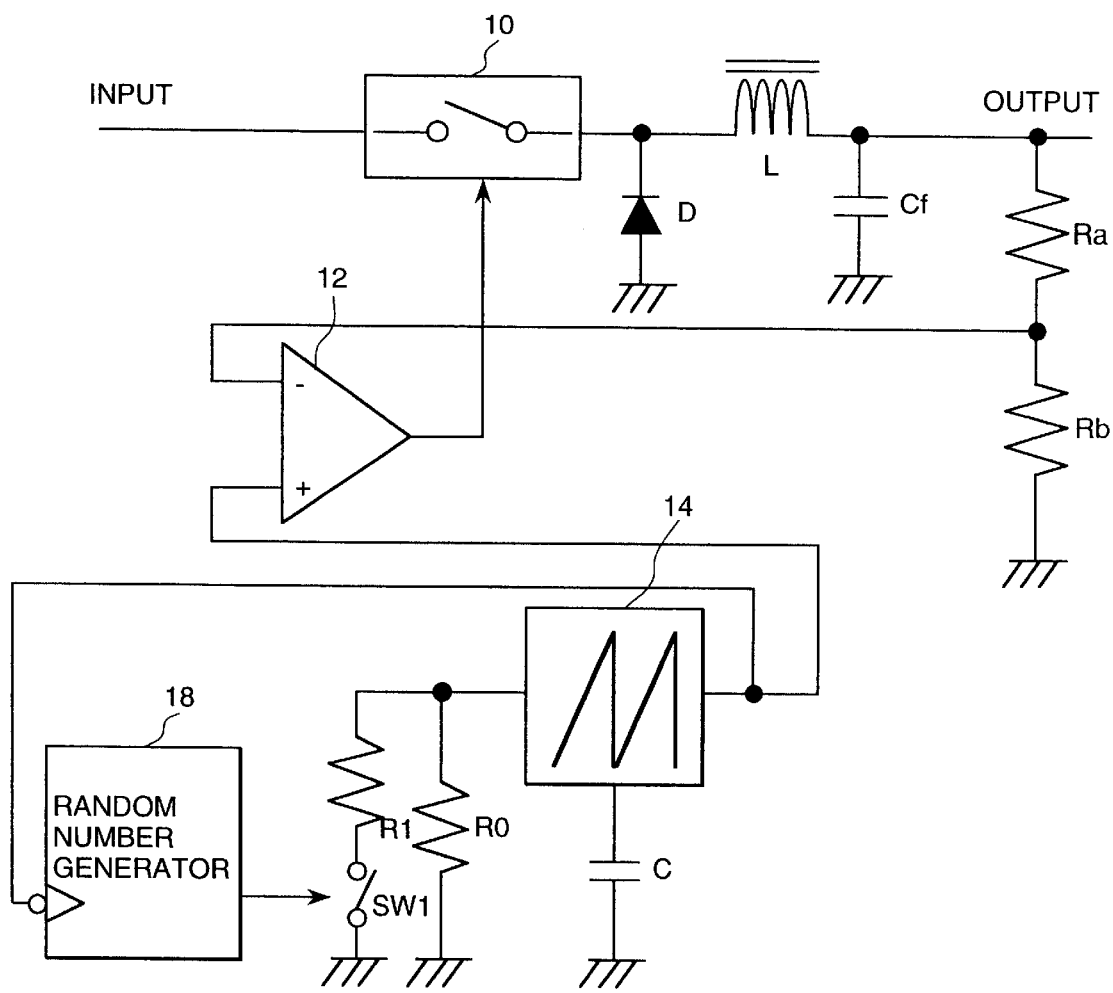
FIG. 10 is a circuit diagram representing the sixth embodiment of a voltage drop type switching regulator according to the present invention.

When the fifth embodiment is implemented in the digital circuit, the random number generator 18 is connected to the sawtooth wave generator 14 instead of counter 16, as shown in FIG. 10 (sixth embodiment). The switch SW1 is changed by the random number generator 18 actuated synchronously with signals of sawtooth waveform produced from the sawtooth wave generator 14.

As a random number generator 18, it is possible to use the circuit for generating the signals by random M series through the combination of the shift register and exclusive logical sum (OR), for example.

Figure 11:
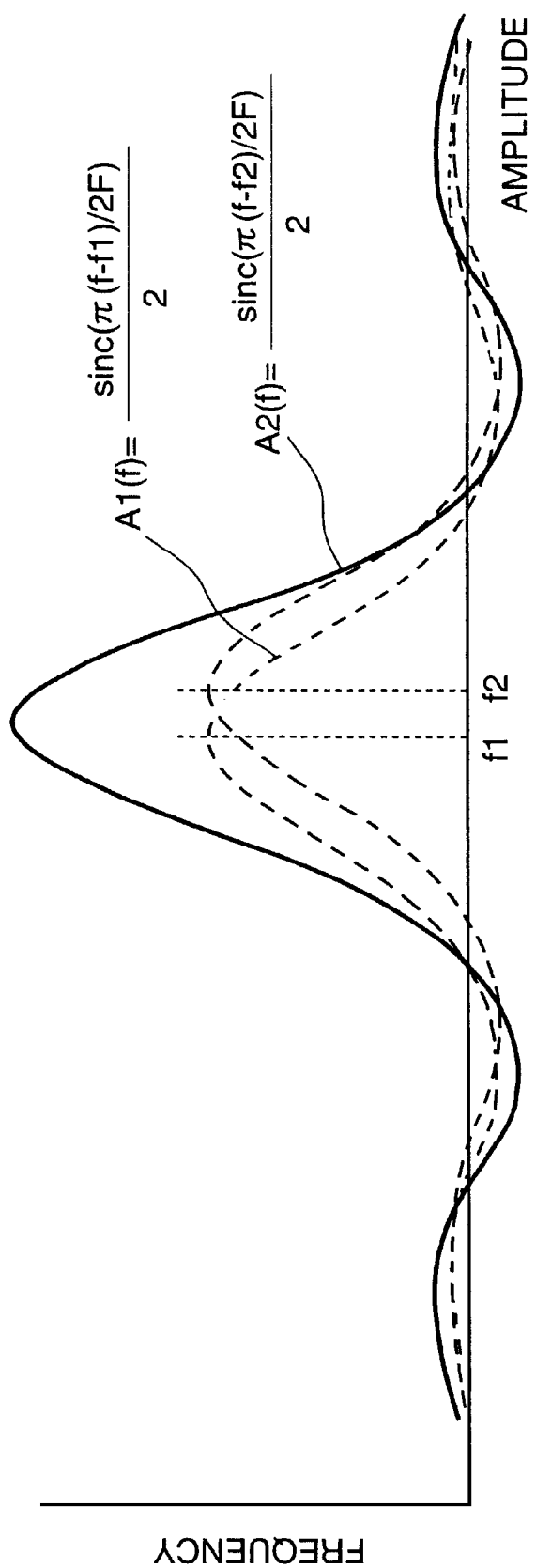
FIG. 11 is a waveform diagram when the spectrum is derived by algebraic calculation method.

Algebraic calculation was made to get the frequency spectrum of the switching regulator according to the present embodiment. The switching waveform as shown in FIG. 11 was obtained.

When deriving the spectrum, the spectrum is obtained when two frequencies f1 and f2 are switched at random. In this case, the frequency of the generated waveform is changed at random. For this reason, the envelope is non-periodic, and an attempt is made to get an overlap of the burst signals having the envelope of independent rectangular pulse. Thus, similarly to a single rectangular pulse, the envelope spectrum can be given as follows:

$$A(f) = \operatorname{sinc}(2\pi f(T/4))/2 \qquad [\text{Eq. 7}]$$
$$= \operatorname{sinc}(\pi f/2F)/2$$

In the area of f>0, the spectrum of the switching waveform can be expressed as follows:

$$A(f) = \operatorname{sinc}(\pi(f - f1)/2F)/2 + \operatorname{sinc}(\pi(f - f2)/2F)/2 \quad [\text{Eq. 8}]$$

The spectrum of the switching waveform is obtained.

Figure 12:
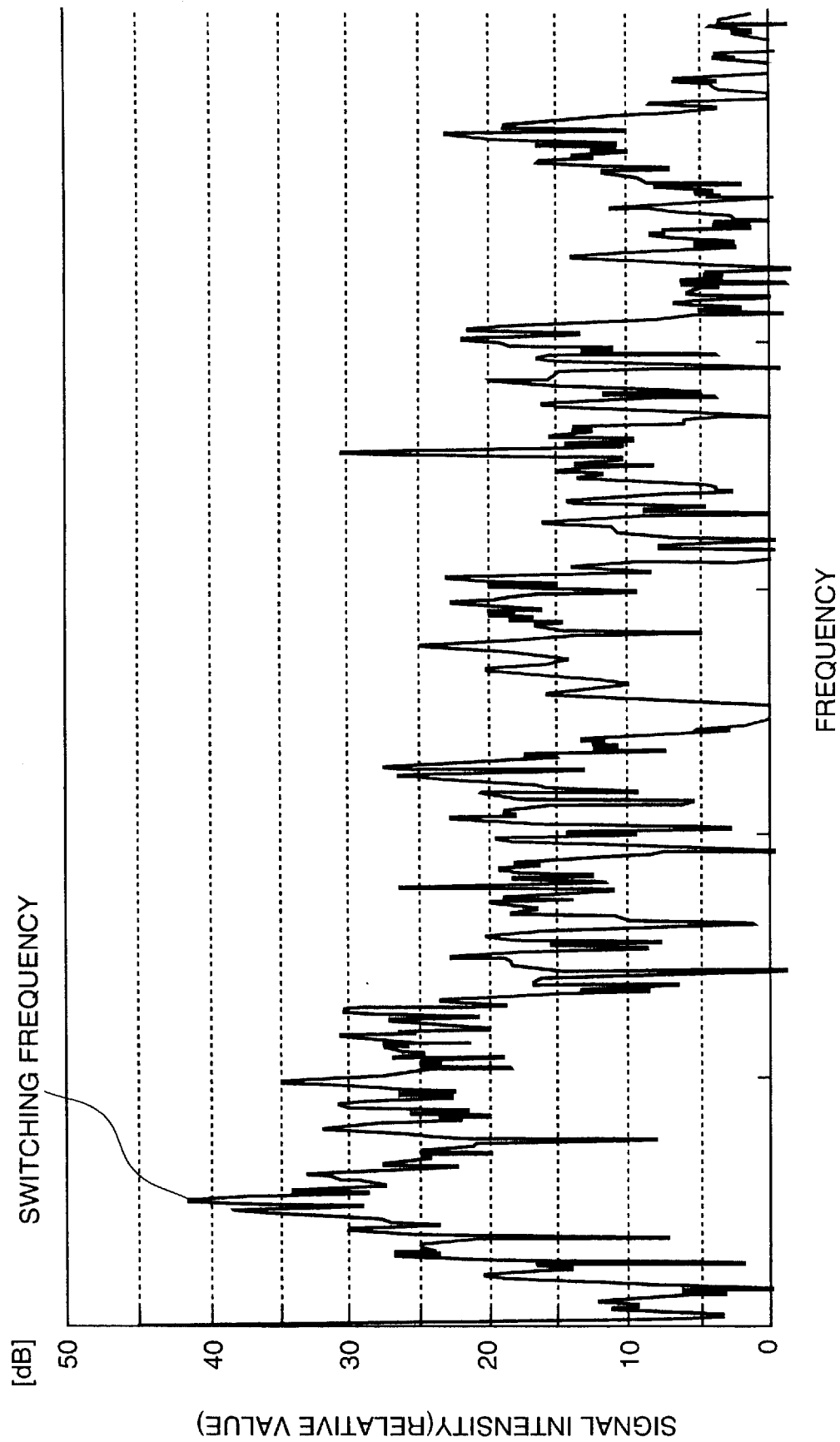
FIG. 12 is a waveform diagram when the spectrum is derived by FET.

For simplicity, the spectrum of only the fundamental wave is obtained in FIG. 11. It can be inferred that the harmonic wave has the similar trend. For the harmonic wave, combinations of an enormous amount of frequency components must be taken in account. Since it is difficult to get the result by algebraic calculation, the inventors of the present invention use the numerical analysis (FFT: Fast Fourier Transform) to get it. FIG. 12 shows the result of FFT of the switching waveform (rectangular wave at 30% duty ratio) under the conditions of "f2=1.4 f1, F=f1, f2". The frequency in FIG. 12 indicates the value obtained by normalizing the measured frequency by means of switching frequency.

As shown in FIG. 11, the spectrum is distributed in continuation with the envelope shown in FIG. 5. The result of FFT shown in FIG. 12 also gives a spectrum distributed almost in continuation with the envelope shown in FIG. 7. Thus, the peak value is reduced correspondingly.

As discussed above, the present embodiment allows the amplitude of the switching noise to be reduced or eliminated by spreading the spectrum of the switching noise generated from the switching regulator and by diffusing the energy of noise, even when a simple circuit configuration shown in FIG. 10 is used.

Figure 13:
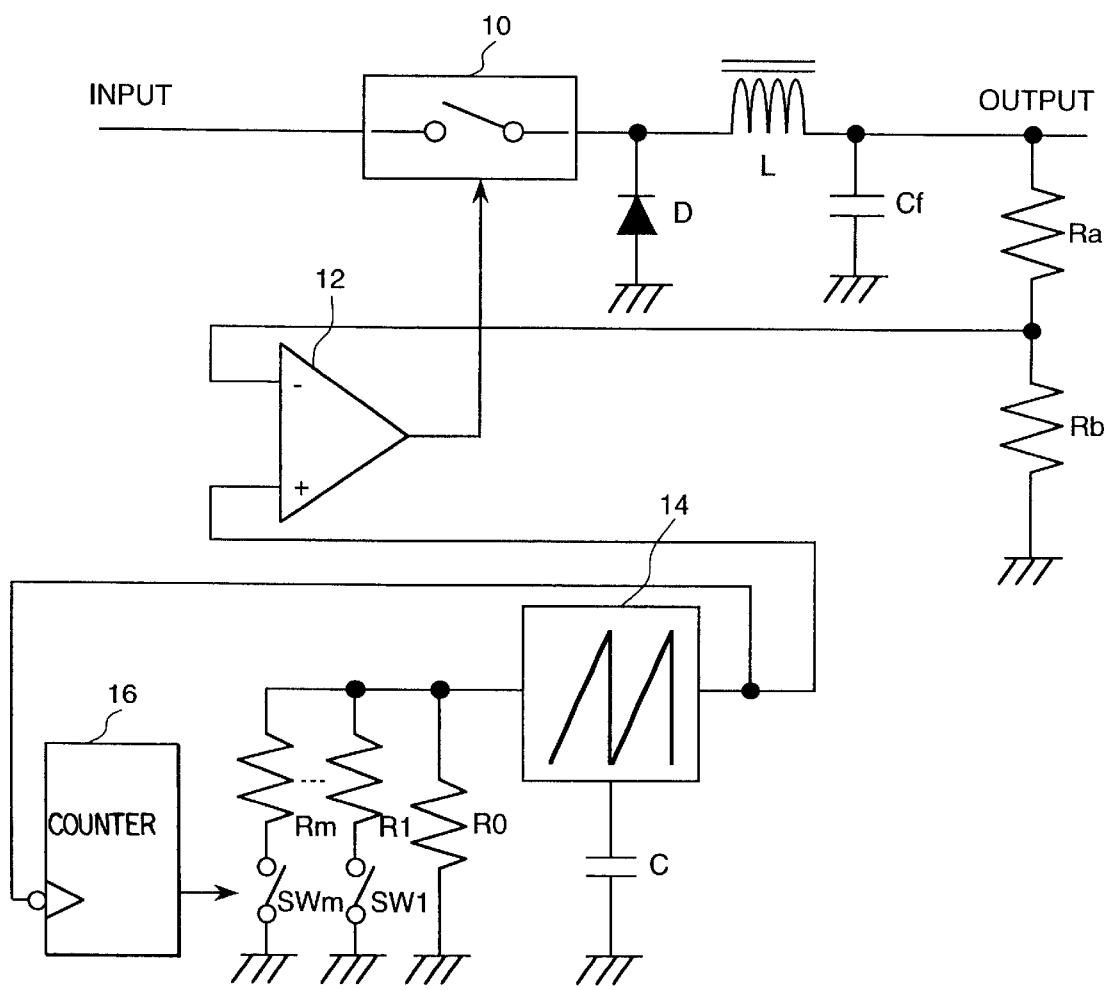
FIG. 13 is a circuit diagram representing the seventh embodiment of a voltage drop type switching regulator according to the present invention.

The following describes the seventh embodiment of the present invention with reference to FIG. 13: In this embodiment, the circuit for generating switching signals by sequential selection of the signals of sawtooth waveform having multiple discrete frequencies f1 to fn is implemented in the form of a digital circuit. Unlike the case of FIG. 3, multiple resistors R1, ..., Rn and switches SW1, ..., SWm are connected as binary ladders to the resistor R0 in parallel with the sawtooth wave generator 14. The present embodiment is the same as that shown in FIG. 3, except that multiple resistors and switches are provided.

According to the present embodiment, the sawtooth waves of the frequency corresponding to the time constants C and R0 are generated when switches SW1 to SWm are all open. When any one of the switches SW1 to SWm is closed, the waveform of the frequency corresponding to C, RO and time constant determined by the parallel combined resistance of the resistor Ri connected to the closed switch SWI is generated. The parallel combined resistance of the resistor Ri is given by:

$$\frac{1}{\frac{1}{Ro} + \sum_i \frac{1}{Ri}} \qquad [\text{Eq. 9}]$$

Opening/closing operation of the switch SW1, ..., SWm is controlled by the counter 16 actuated synchronously with sawtooth wave. The fluctuation of the switching regulator output voltage is prevented by ensuring that the tilt of sawtooth wave does not change in the middle.

Let us assume that each resistance Ri is as shown in the following equation:

$$\frac{1}{Ri} \neq \sum_{k \neq 1} \frac{1}{Rk} \qquad [\text{Eq. 10}]$$

Then "m" resistors provide signals of frequencies corresponding to $2^m$ parallel combined resistances (a m-th power of 2). In other words, signals of frequencies corresponding to $2^m$ parallel combined resistances (a m-th power of 2) can be generated if the value of each resistor Ri is set to a value different form the parallel combined resistances when other resistors are connected in parallel.

Especially when the value of individual resistors Ri is expressed by the following equation:

$$Ri = Kr \cdot 2^{-i} \qquad [\text{Eq. 11}]$$

Then "m" resistors allow $2^m$ (m-th power of 2) conductances to be produced at an equally spaced interval. It is possible to produce the signals of the frequency corresponding to 2m (m-th power of 2) parallel resistance (parallel combined resistance) at an almost equally spaced interval.

Figure 14:
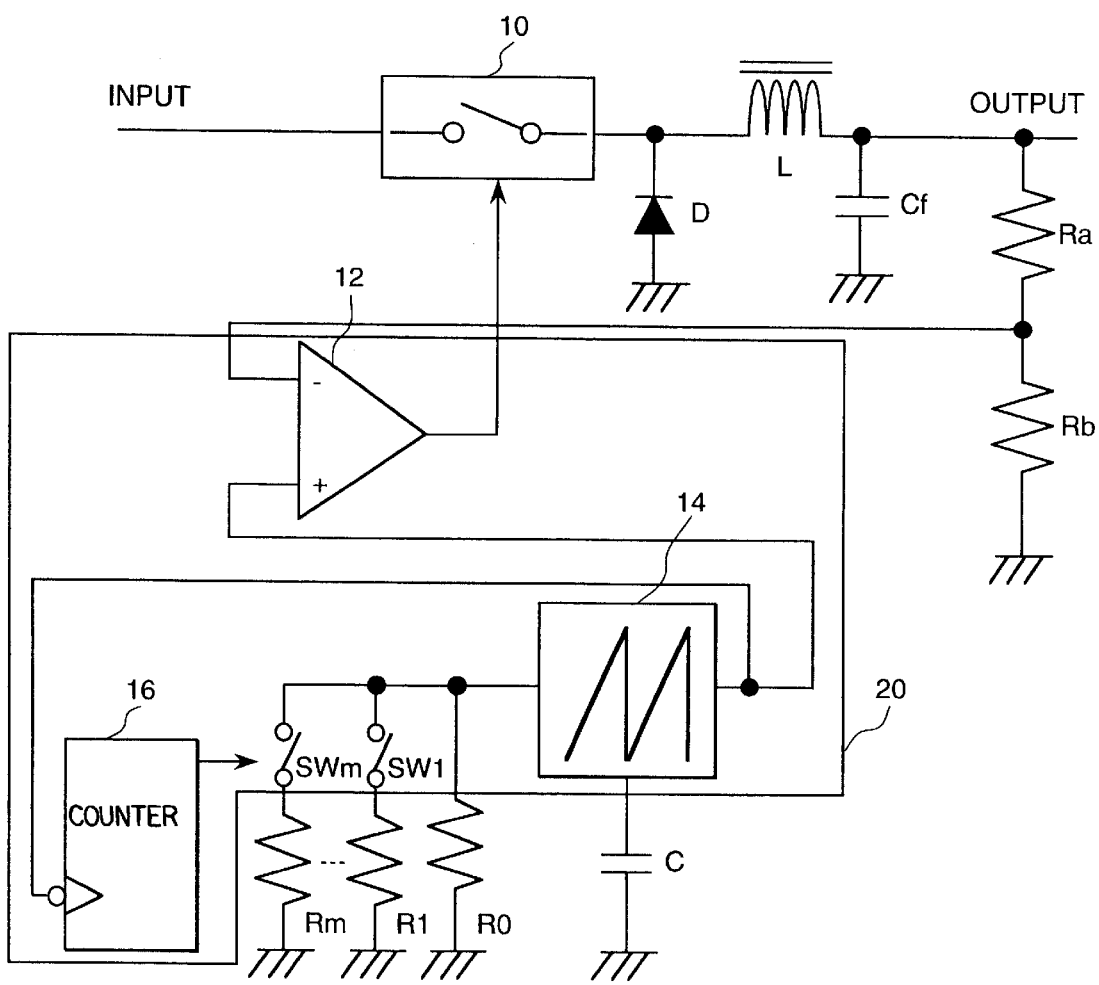
FIG. 14 is a circuit diagram representing the eighth embodiment of a voltage drop type switching regulator according to the present invention.

The following describes the eighth embodiment of the present invention with reference to FIG. 14: In this embodiment, of the switching regulator shown in FIG. 13, the comparator 12, sawtooth wave generator 14, counter 16 and switches SW1 to SWm are integrated into the LSI (large integrated circuit) using a digital circuit. In this case, the switches SW1 to SWm having been arranged on the ground side are arranged in the hot side. Otherwise, the configuration is the same as that shown in FIG. 13.

According to the present embodiment, when the comparator 12, sawtooth wave generator 14, counter 16 and switches SW1 to SWm are integrated into the LSI20, the switches SW1 to SWm are arranged in the hot side. As a result, the wiring area is reduced as compared to the case where the switches SW1 to SWm arranged on the ground side are integrated.

Furthermore, the number of parts are reduced since the comparator 12, sawtooth wave generator 14, counter 16 and switches SW1 to SWm are integrated into the LSI. This has lead to the reduction in price, failure rate and dimensions. Switches SW1 to SWm can be produced by the transistor (bi-polar or FET).

Determination of the frequency of the sawtooth wave of the sawtooth wave generator 14 greatly depends on the resistor R0, so the accuracy requirement of resistors R1 to Rm is not so severe as that of the resistor R0. For this reason, switches SW1 to SWm and resistors R1 to Rm can be built in the LSI 20, as shown in Embodiment (ninth embodiment) of FIG. 1. Normally, the resistor built in the LSI exhibits an accuracy up to scores of percent without trimming. This is sufficient for a resistor used merely to change the time constant.

According to the present embodiment, the signals waveform having multiple discrete frequencies f1 to fn can be produced by increasing the number of resistors and switches. The effect diffusing the switching noise of the switching regulator can be improved substantially while the number of parts, price, failure rate and dimensions are reduced.

In the embodiment given in FIGS. 13 to 15, 3th power of 2, namely, eight frequencies f1 to f8 can be produced by adding three resistors R1, R2 and R3 and switches SW1, SW2 and SW as binary ladders, in addition to resistor R0.

Figure 15:
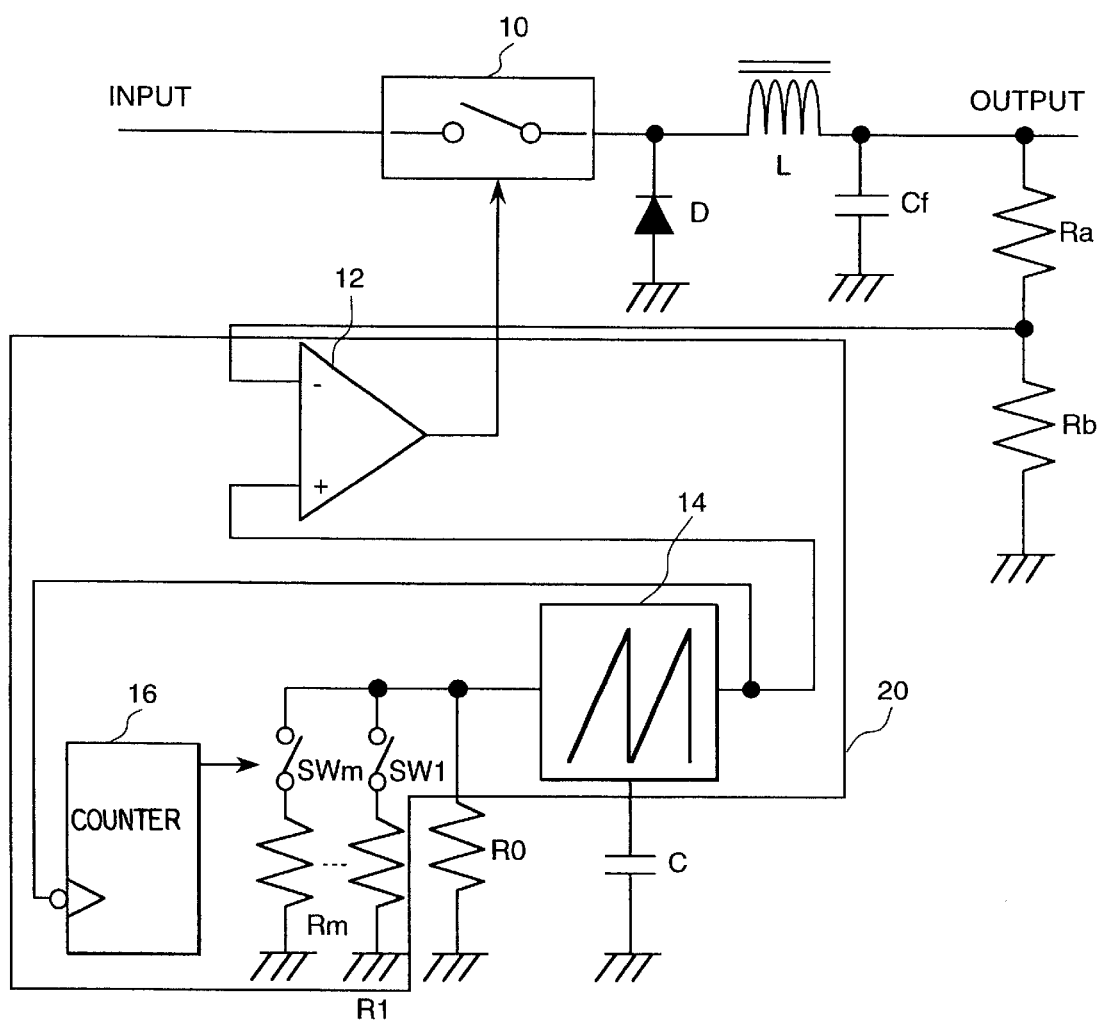
FIG. 15 is a circuit diagram representing the ninth embodiment of a voltage drop type switching regulator according to the present invention.

Further, the resistors R1 to Rm are built in the LSI 20 according to the embodiment shown in FIG. 15. This permits many resistors to be incorporated to produce multiple discrete frequencies. The effect of diffusing the switching noise of the switching regulator can be improved in the practical circuit size. For example, the number of resistors required to produce 1024 frequencies, m=10, can be ensured in the practical circuit size.

Figure 16:
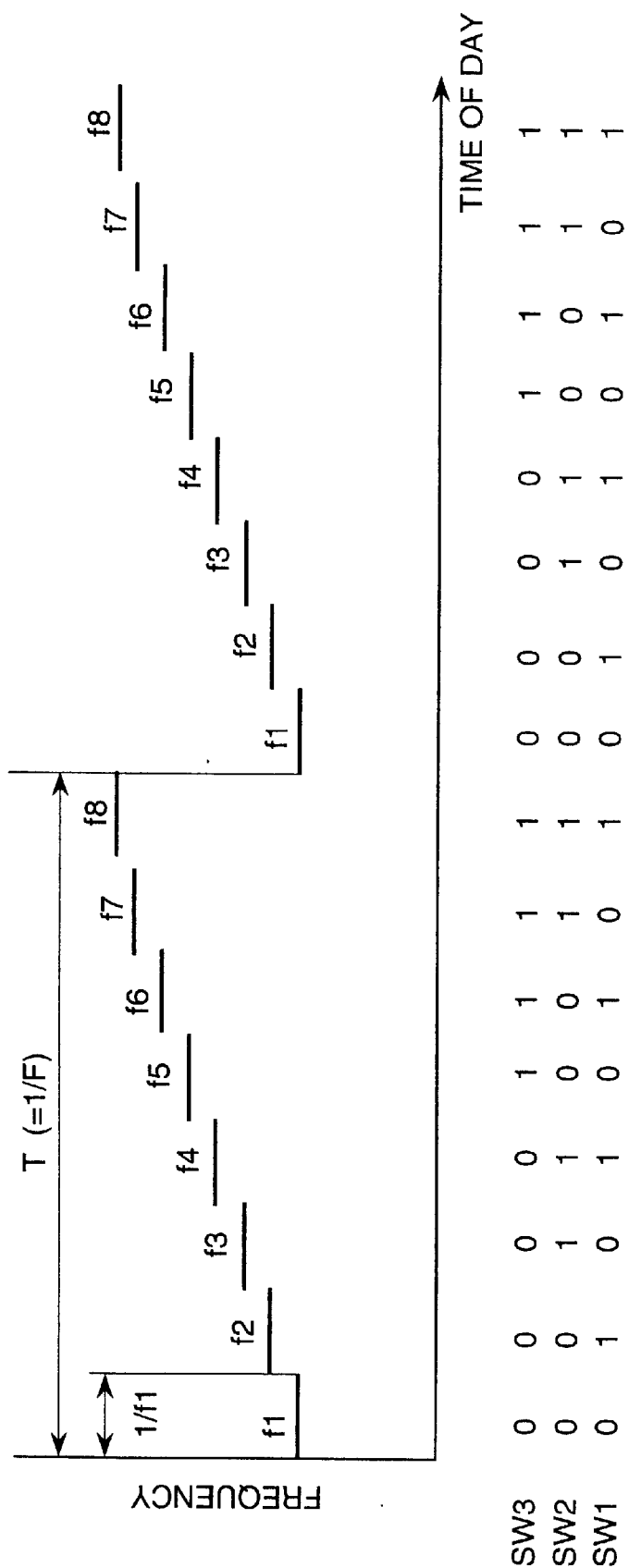
FIG. 16 is a diagram representing how to change frequencies in the ascending order.
Figure 17:
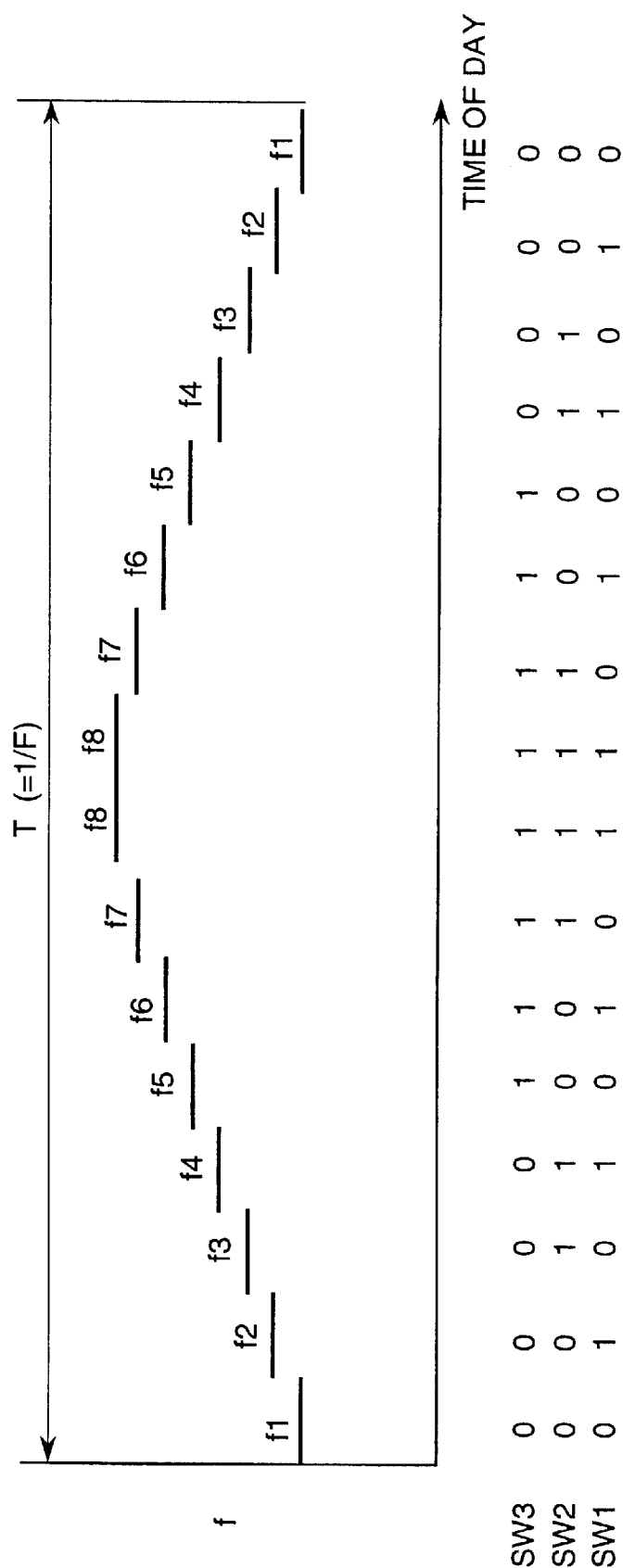
FIG. 17 is a diagram representing how to switch the frequencies alternately in ascending order and descending order.

When eight frequencies f1 to f8 as switching frequencies are switched sequentially in the embodiment shown in FIGS. 13 to 15, it is possible to adopt the method of switching frequencies in ascending order, namely, the method where the signals of sawtooth waveform are selected sequentially in the order from the signals having lower frequencies to those having higher frequencies as shown in FIG. 16. It is also possible to adopt the method of switching the signals having eight frequencies f1 to f8 alternately in ascending order and in descending order as shown in FIG. 17, namely, the method where, in the first step, the signals of sawtooth waveform are selected sequentially in the order from the signals having lower frequencies to those having higher frequencies; then, in the second step, they are selected sequentially in the order from the signals having higher frequencies to those having lower frequencies, wherein these two steps are repeated.

Here, the method of switching the frequencies in ascending order and the method for switching the frequencies alternately in ascending order and descending order were applied to the switching regulator in the embodiment shown in FIGS. 13 to 15 to get the frequency spectrum by algebraic calculation. This had lead to the switching waveform shown in FIG. 18.

In this case, it is complicated to get all the spectrums by switching multiple frequencies periodically in the process of deriving the spectrum. So the target waveform is approximated to the carrier wave of the center frequency fo which is frequency-modulated by the sinusoidal wave of frequency F.

When the amplitude of the waveform is assumed as "1" in this case, the spectrum can be expressed as follows:

$$a(t) = \cos(2\pi f_0 t + \beta \sin 2\pi F t) \qquad [\text{Eq. 12}]$$

where $\beta$ = modulation exponent (= $\Delta f / F$)

This is expanded into an infinite series, as shown in the following equation.

$$\begin{aligned} a(t) = & J_0(\beta) \cdot \cos 2\pi f_0 t + \\ & J_1(\beta)\{\cos 2\pi (f_0 + F)t - \cos 2\pi (f_0 - F)t\} + \\ & J_2(\beta)\{\cos 2\pi (f_0 + 2F)t - \cos 2\pi (f_0 - 2F)t\} + \\ & J_3(\beta)\{\cos 2\pi (f_0 + 3F)t - \cos 2\pi (f_0 - 3F)t\} + \dots \end{aligned} \qquad [\text{Eq. 13}]$$

where $J_n(\beta)$: n-th degree first Bessel function

Figure 18:
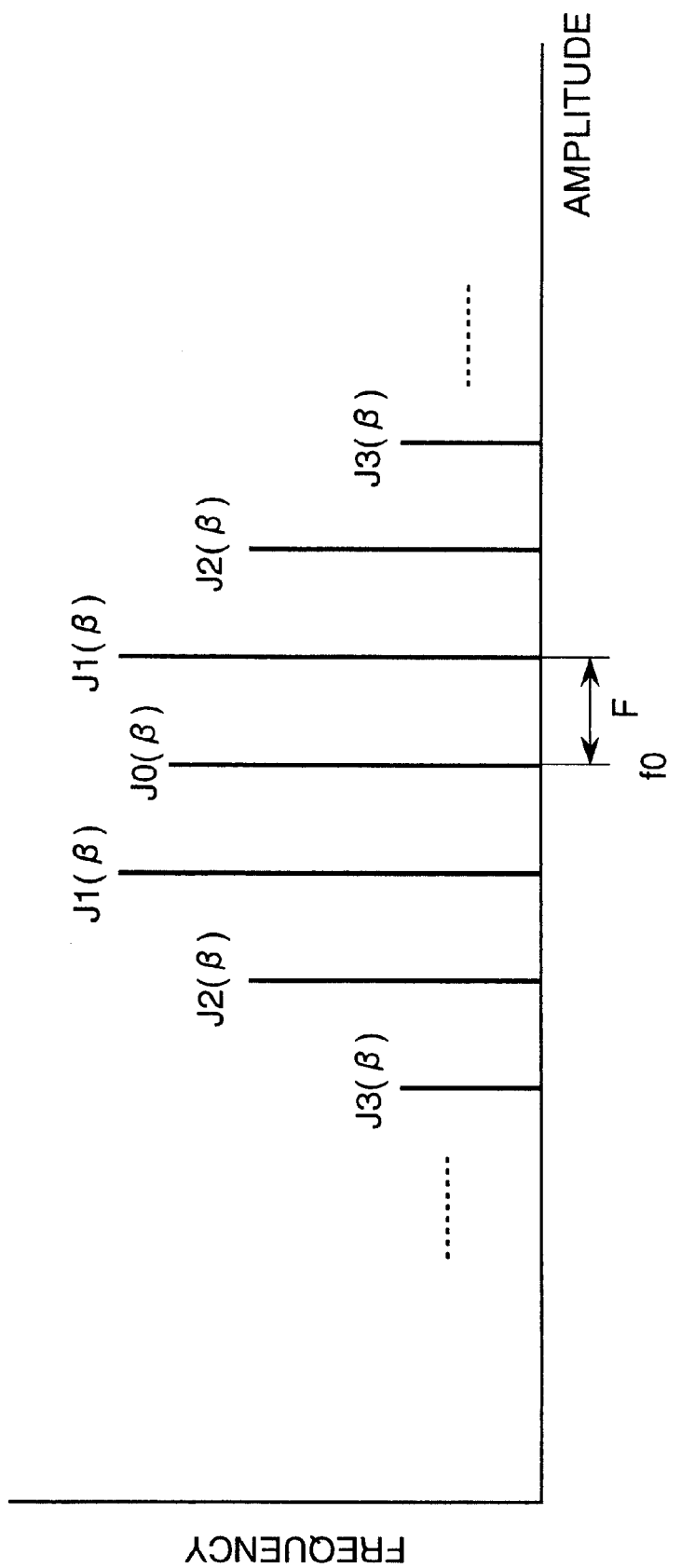
FIG. 18 is a waveform diagram when the spectrum is derived by algebraic calculation method.

Thus, the spectrum is as shown in FIG. 18.

Figure 19:
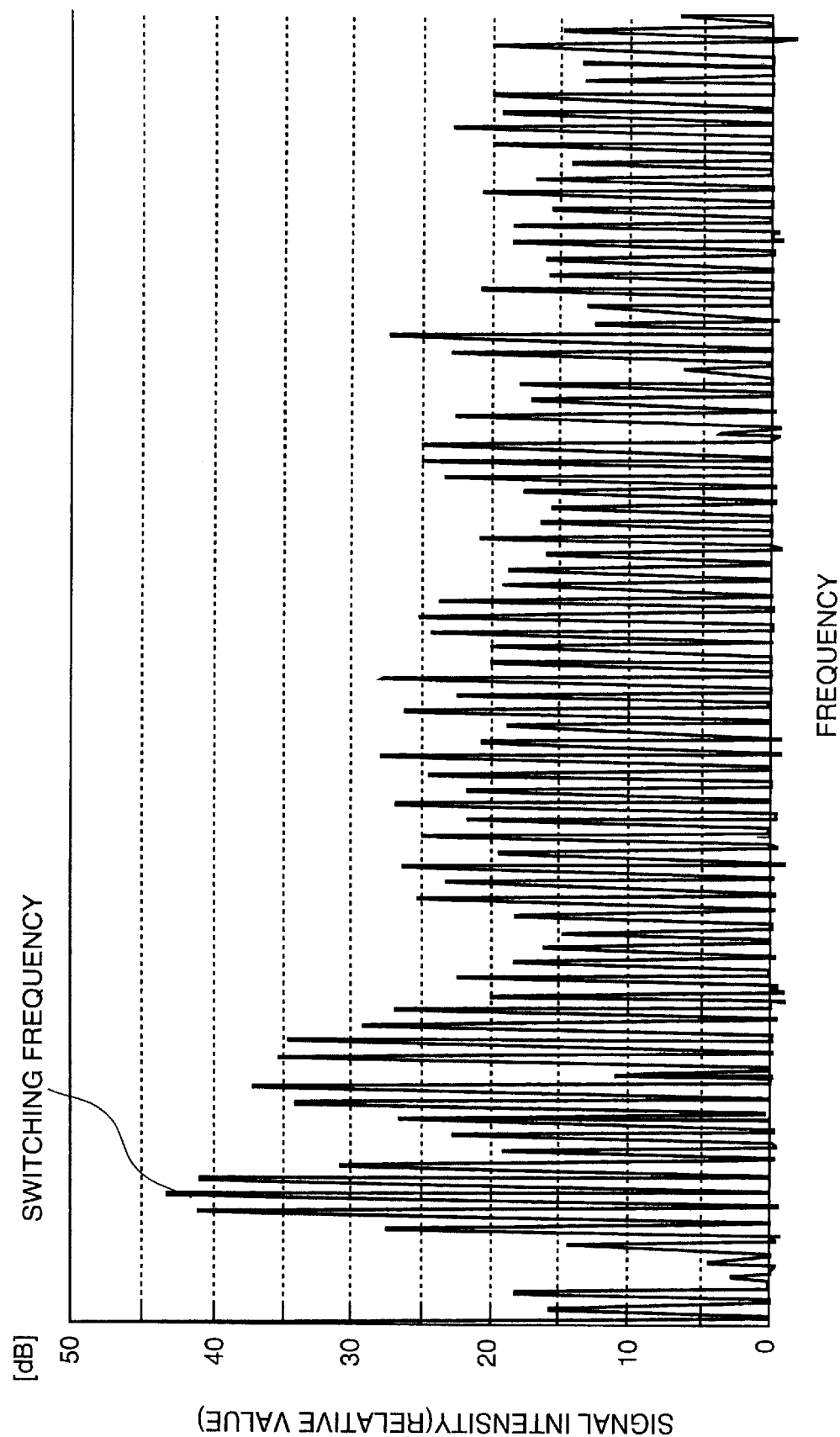
FIG. 19 is a waveform diagram showing derivation of the spectrum by FFT when the frequency is changed according to the ascending order.
Figure 20:
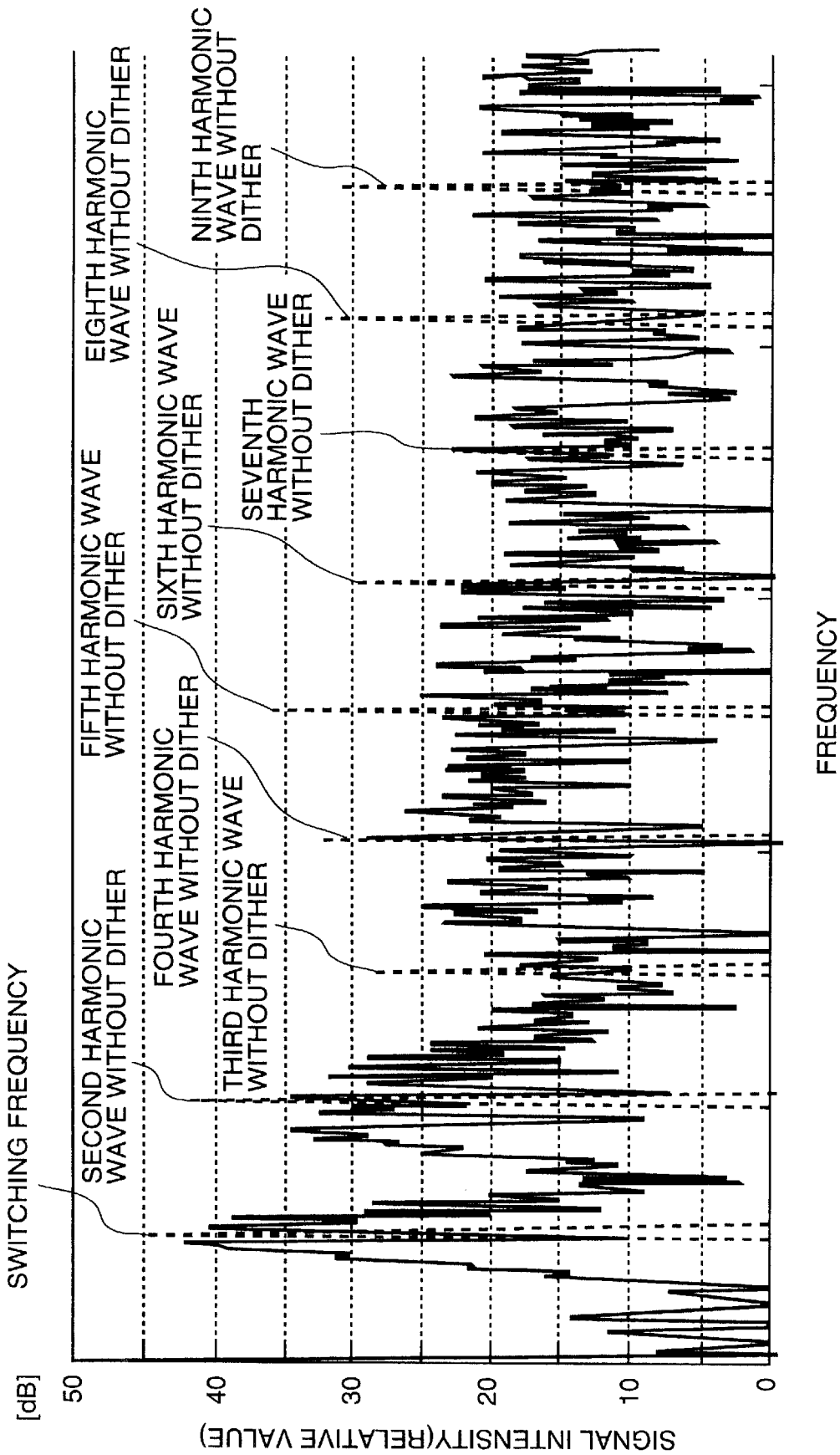
FIG. 20 is a waveform diagram showing derivation of the spectrum by FFT when the frequencies are switched alternately in ascending order and descending order.
Figure 21:
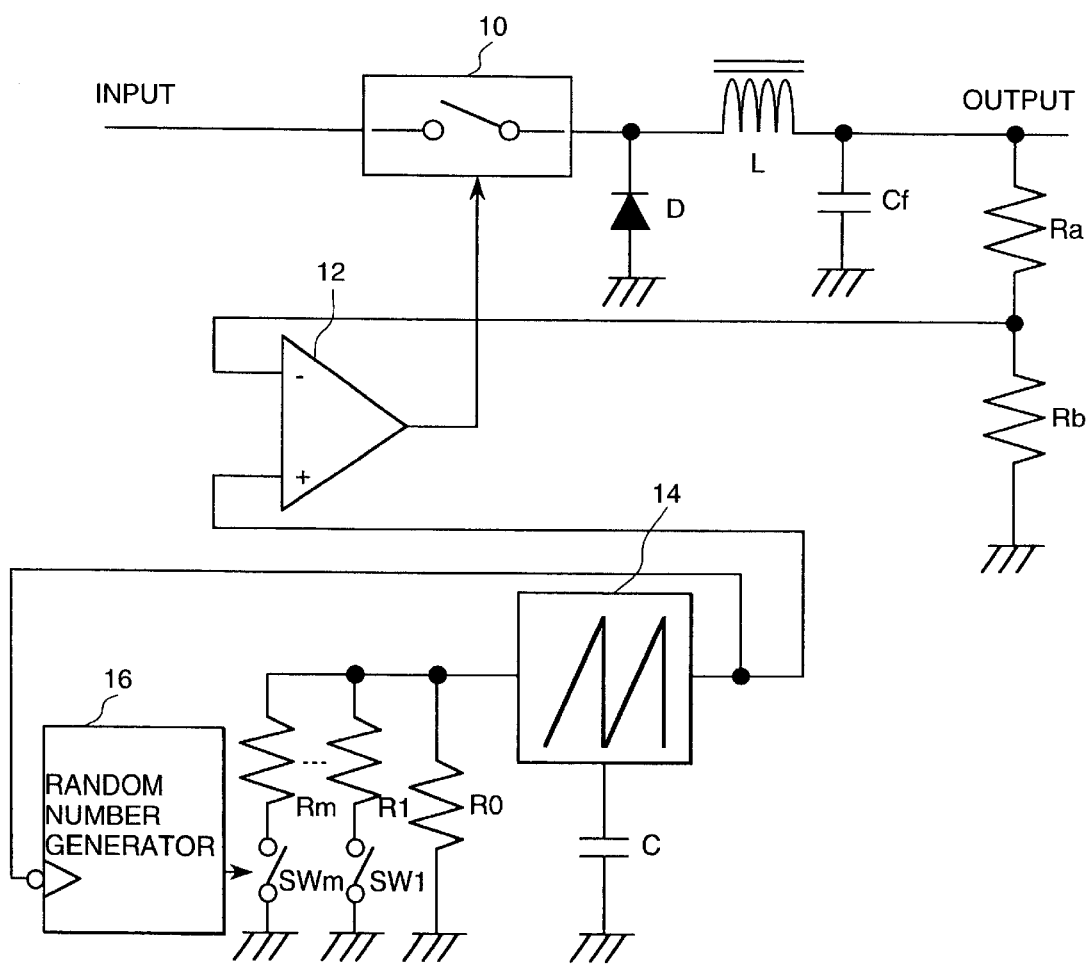
FIG. 21 is a circuit diagram representing the tenth embodiment of a voltage drop type switching regulator according to the present invention.

For simplicity, the spectrum of only the fundamental wave is obtained in FIG. 18. It can be inferred that the harmonic wave has the similar trend. For the harmonic wave, combinations of an enormous amount of frequency components must be taken in account. Since it is difficult to get the result by algebraic calculation, the inventors of the present invention use the numerical analysis (FFT: Fast Fourier Transform) to get it. FIG. 19 shows the result of FFT of the switching waveform (rectangular wave at 30% duty ratio) under the conditions of "f8=1.4 f1, frequency change in FIG. 16". Similarly, FIG. 20 shows the result of FFT of the switching waveform (rectangular wave at 30% duty ratio) under the conditions of "f8=1.4 f1, frequency change in FIG. 17". The frequencies in FIG. 19 and indicate the values obtained by normalizing the measured frequencies by means of switching frequency.

FIG. 18 reveals that, because of the characteristics of the Bessel function, the bottom portion expands with the increase of β, and the peak is lowered with the result that the effect of diffusing the switching noise is improved.

The following compares the method of switching the frequencies in the ascending order as shown in FIG. 16 to the method of repeating the step of alternating the ascending and descending orders as shown in FIG. 17: F=$f_o$/n according to the method shown in FIG. 16, while F=$f_o$/2n according to the method shown in FIG. 17. Since β=Δf/F, it can be seen that β is increased in the method shown in FIG. 17, and the effect of diffusing the switching noise is higher than that in FIG. 16. This is revealed by the result of numerical analysis (FFE: fast Fourier transform). The spectrum according to the method of repeating the step of alternating the ascending and descending orders as shown in FIG. 20 is more diffused than that according to the method of the ascending order, and is characterized by a lower peak value.

In FIG. 20, the spectrum (spectrum with constant frequency) without spectrum diffusion (dither) of switching noise is indicated by a broken line for the sake of comparison. Comparison between the characteristics of this broken line and those of the sequential frequency switching method (solid line)
reveals that the noise reduction effect amounts to about 7 dB for the second harmonic wave and about 10 dB for the third and later harmonic waves according to the present invention.

The same effect has been obtained in the experiment with the circuit actually used. For reference Kr=400 kΩ for $R_o$=10 kΩ in the circuit used for experiment by the present inventors. R1=200 kΩ, R2=100 kΩ and R3==51 kΩ using the E24 based resistance value available at lower costs.

According to the present embodiment, a circuit configuration in the practical size is used to diffuse the spectrum of the switching noise of the switching regulator and to diffuse the energy of noise, thereby ensuring a stable reduction of the amplitude of switching noise at all times, as discussed above.

The following describes the tenth embodiment of the present invention with reference to FIG. 10: In this embodiment, a digital circuit is used to implement the embodiment shown in FIG. 8. The random number generator 18 is provided instead of the counter 16 shown in FIG. 13. Otherwise, its configuration is the same as that of FIG. 13. Namely, the opening/closing operation of the switch SW1, . . . , SWm is controlled by the random number generator 18 actuating synchronously with sawtooth wave.

According to the present embodiment, "m" resistors is subjected to random selection by switching signals (pulses) from the random number generator 18. This allows the component of switching noise to be diffused over a still wider range by random selection of $2^m$ (m-th power of 2) discrete frequency with the result that the peak of switching noise cannot be further reduced.

The following is clarified by comparison among the effects of diffusing the spectra of the switching noise in various embodiments: As shown in FIGS. 2 and 9, the spectrum is distributed as represented by sinc (x) in FIGS. 5 and 10, according to the method of switching two frequencies.

As shown in FIGS. 1, 8 and 13 in the meantime, distribution of the spectrum can be represented by Bessel function given in FIG. 18, according to the method of sequential switching of multiple frequencies f1 to fn.

The former envelope is uni-modal and the amplitude of the component of the center frequency is the greatest. By contrast, the latter envelope is uni-modal when β is smaller. If β is larger, it turns bimodal. Moreover, the peak is low with wider base, and the effect of diffusing the spectrum of the switching noise is increased.

In other words, since β=Δf/F, β can be increased by increasing Δf or decreasing F. However, if Δf is increased, the operating frequency range of the switching regulator must be increased, and this makes designing more difficult. Further, since the frequency is switched synchronously with the sawtooth wave, the following relationship holds, $$F = \frac{1}{\sum_{k=1}^{n} \frac{1}{fk}} \neq fo/n \quad [\text{Eq. 14}]$$

Accordingly, when consideration is given to the i-th degree harmonic wave of fo, the frequency of the n-th sideband, namely, the frequency of the sideband away nF from the i-th degree harmonic wave agrees with that of the (i−1)-th or (i+1)-th harmonic wave component, with the result that the effect of spectrum diffusion is reduced. This reveals that a greater effect is obtained as the "F" is lower, namely, as "n" is greater.

When the above fact is taken into account, it is clear that the method according to the present invention is superior in that it allows n=$2^m$ (m-th power of 2) frequencies to be realized by a practical circuit size, namely, addition of "m" resistors.

Further, the embodiment shown in FIG. 15 provides a substantial reduction of the costs of increasing the number of resistors, with the result that a higher effect can be ensured.

As shown in FIG. 19, when the frequency is changed at random by random number generator 18, the spectrum exhibits a continuous distribution, and the amplitude of the peak can be reduced correspondingly.

As shown in FIG. 17, however, a much greater effect is ensured by the method for reducing F by increasing the number (n) of discrete frequencies and switching the frequencies alternately in ascending order and descending order. The method for switching the frequencies alternately in ascending order and descending order provides a greater effect than random frequency switching even if the random frequency switching method is not used.

In other words, the spectrum diffusion effect is not definite, and greatly depends on the random number sequence in the case of random frequency switching. The effect of mass production can be greatly improved if "m" resistors are built in the LSI 20.

Reference has been made to the voltage drop type switching regulator in the description of the first to tenth embodiments. When this invention is applied to the voltage drop type switching regulator based on the PWM (pulse width modulation) which generates the switching pulse through comparison of the reference waveform having a certain tilt (reference waveform) such as sawtooth and triangular waveforms to the output voltage, and to the electric power converter based on switching of DC/DC converter or the like, it can be applied by providing a function of switching the period of the reference waveform of the electric power converter in the same way as the above embodiment.

Further, by providing a function of switching the period of reference waveform in the same way as above-mentioned embodiments, the present invention can be applied to the electric power converter based on switching which has no voltage feedback, in addition to the feedback switching regulator. In this case, it goes without saying that application of this invention reduces the peak of the switching noise of the electric power converter.

Figure 22:
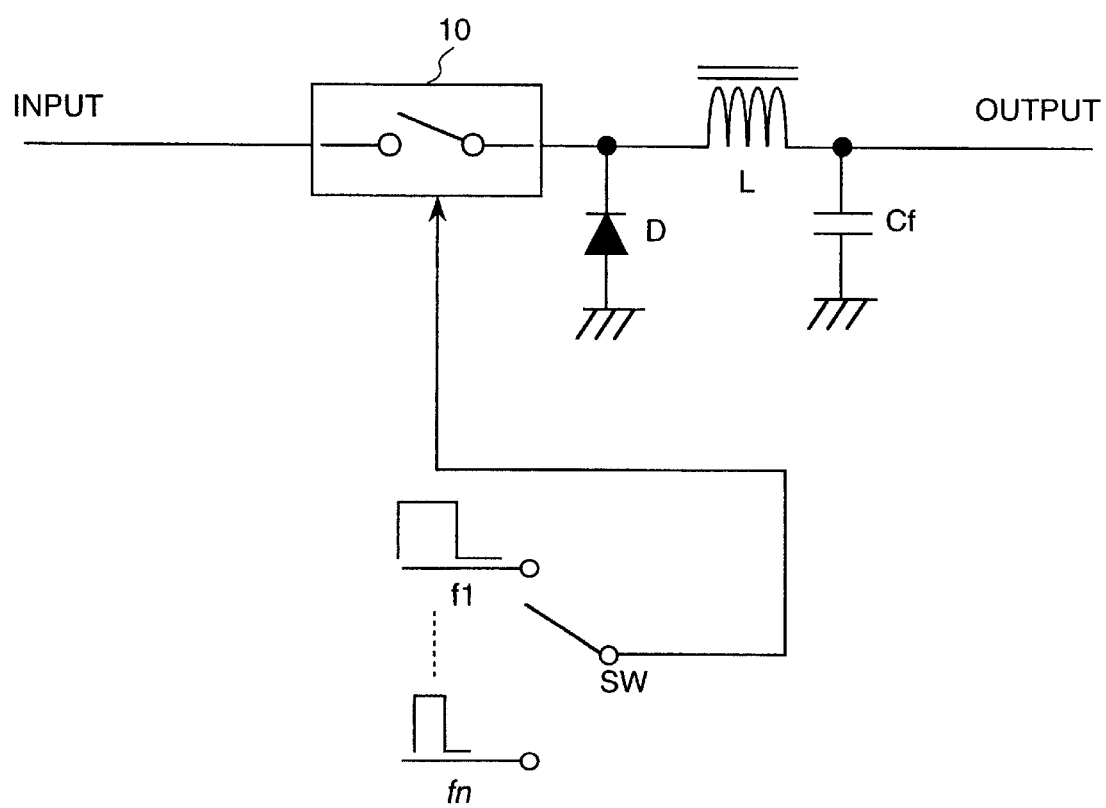
FIG. 22 is a circuit diagram representing the eleventh embodiment of a voltage drop type switching regulator according to the present invention.

For example, it is possible to adopt the configuration wherein signals of rectangular wave with multiple discrete frequencies f1 to fn having a certain duty cycle are selected by the switch SW and the switching element 10 is actuated by selected signals, as shown in FIG. 22.

The present embodiment allows a simple circuit configuration to reduce the peak of the switching noise of the d.c. voltage electric power converter which is not required to ensure high voltage stability.

Figure 23:
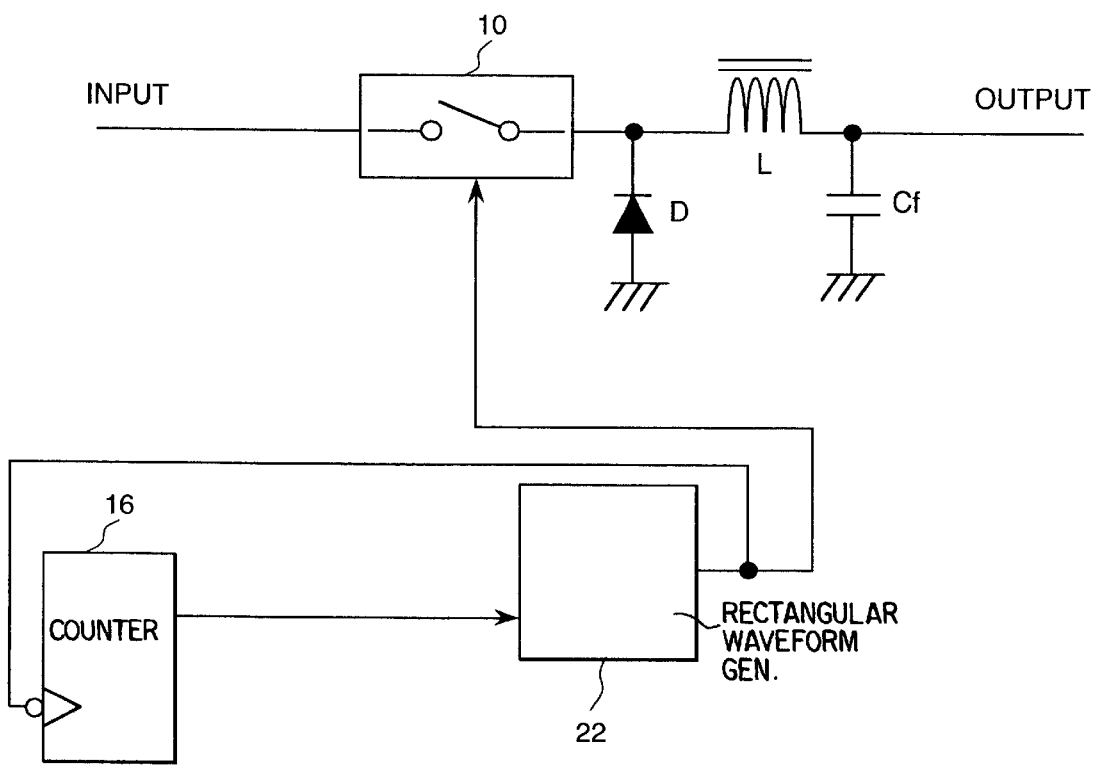
FIG. 23 is a circuit diagram representing the twelfth embodiment of a voltage drop type switching regulator according to the present invention.

To be more specific, rectangular waveform generator 22 and counter 16 are provided as a signal generator and signal selecting means as shown in FIG. 23; signals of the rectangular wave at frequencies f1 to fn are output to the switching element 10 from the rectangular waveform generator 22; and the counter 16 is actuated synchronously with this signal. Then switching operation of the switching element 10 can be performed by the signals of rectangular wave at frequencies f1 to fn.

When the rectangular waveform generator 22 is implemented, the following two methods can be considered, for example: One is the method of using a frequency divider which divides the original frequency (reference frequency), and the other is the method of using the oscillator circuit where the oscillation frequency is changed according to time constant CR. When the method of frequency divider is used, it is sufficient that the division ratio of the frequency divider constituting the rectangular waveform generator 22 be controlled by the output of the counter 16.

Figure 24:
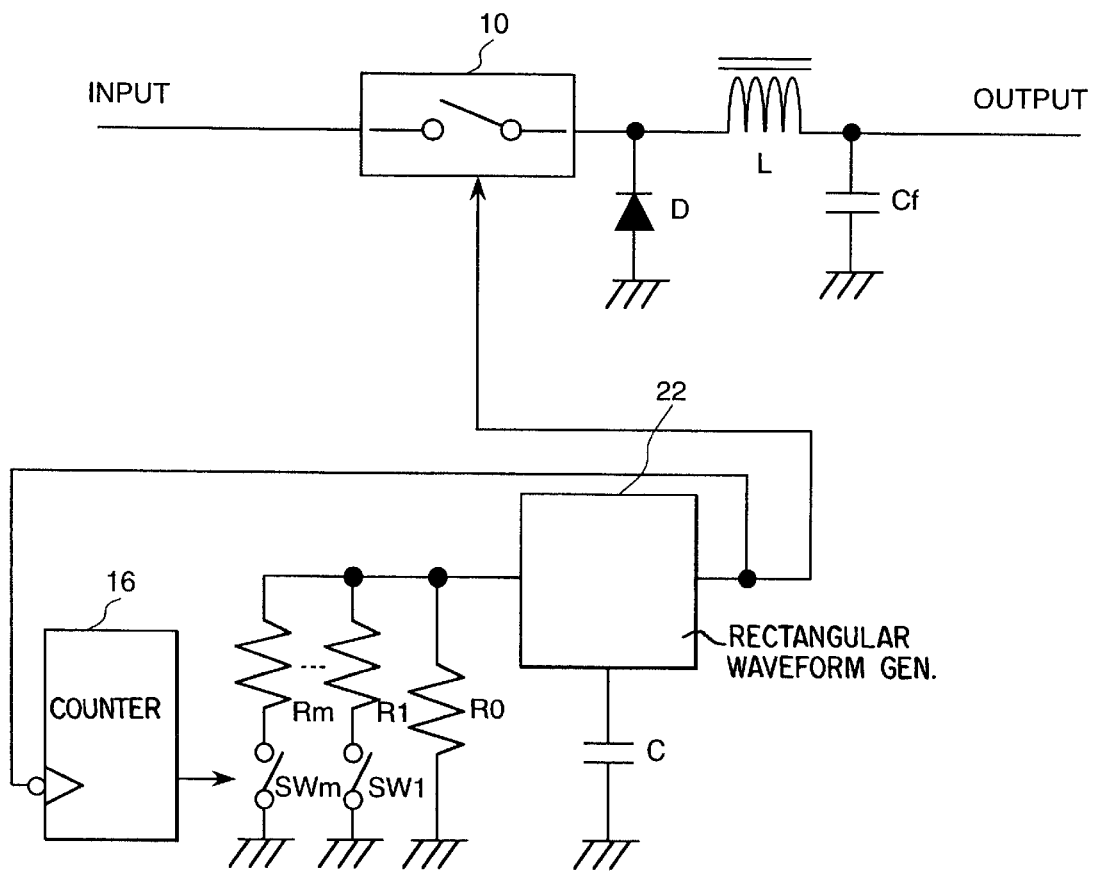
FIG. 24 is a circuit diagram representing the thirteenth embodiment of a voltage drop type switching regulator according to the present invention.

By contrast, when use is made of the method based on the oscillator circuit where the oscillation frequency changes according to the time constant CR, it is possible to adopt the configuration where the rectangular waveform generator 22 is provided with resistors R0 and C as time constant circuits, and the resistors R1 to Rm for changing the time constant and switches SW1 to SWm are also provided, as shown in FIG. 24. Signals of rectangular wave at frequencies f1 to fn can be output by sequentially switching them if the opening/closing operation of switches SW1 to SWm by the output pulse of the counter 16 is controlled.

Figure 25:
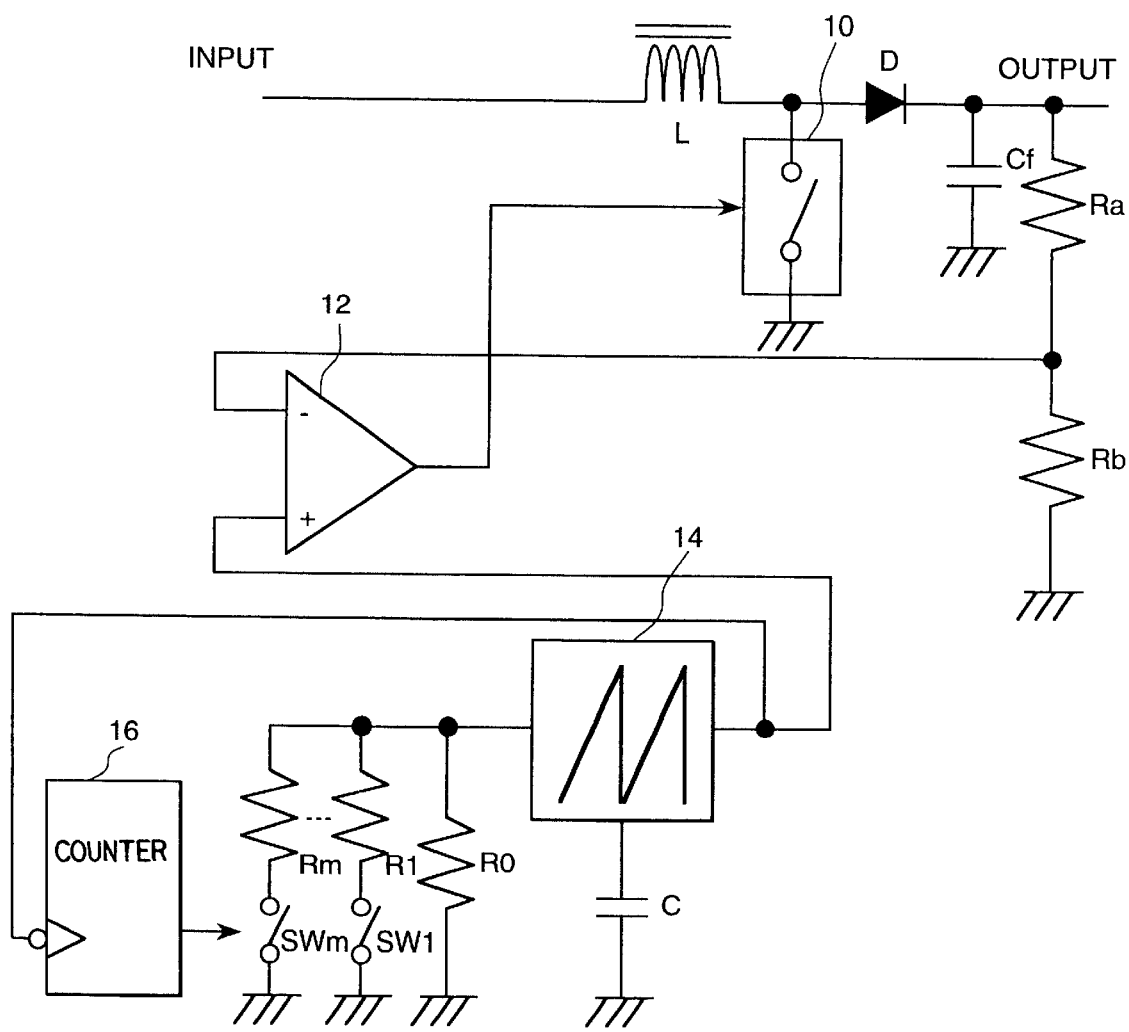
FIG. 25 is a circuit diagram representing an embodiment of a voltage step-up type switching regulator according to the present invention.

When the voltage step-up type switching regulator is configured, it is possible to adopt the configuration shown in FIG. 25 wherein a free wheel diode D is inserted between the reactor L and capacitor Cf; one end of the switching element 10 is connected to the contact point between the reactor L and free wheel diode D, with the other end of the switching element 10 grounded; and switching operation of the switching element 10 is controlled by the output of the comparator 12.

Figure 26:
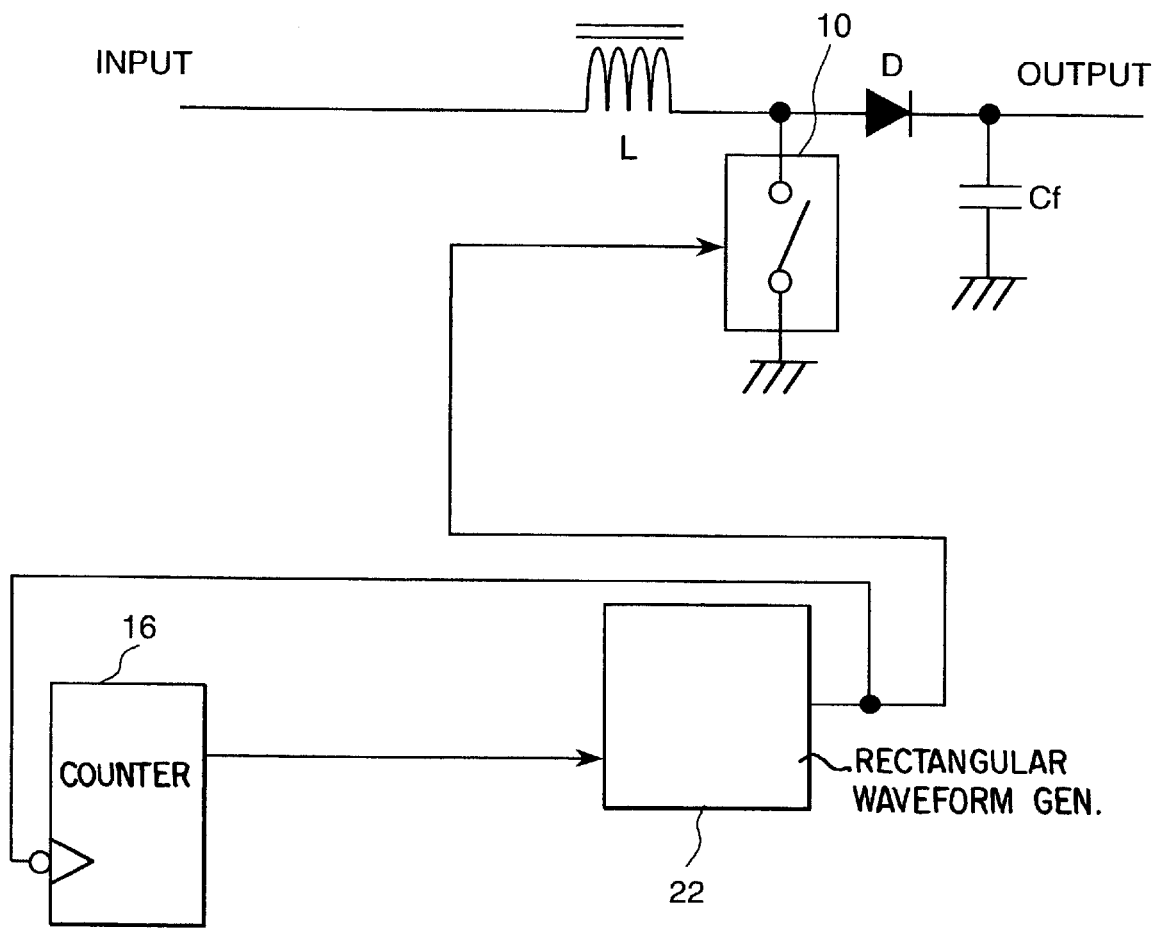
FIG. 26 is a circuit diagram representing another embodiment of a voltage step-up type switching regulator according to the present invention.

When the present invention is applied to the voltage step-up type voltage converter circuit without feedback system, it is possible to use the configuration shown in FIG. 26 wherein a free wheel diode D is inserted between the reactor L and capacitor Cf; the switching element 10 is connected to the contact point between the reactor L and free wheel diode D, with the other end of the switching element 10 grounded; and the rectangular wave from the rectangular waveform generator 22 is applied to the switching element 10.

Figure 27:
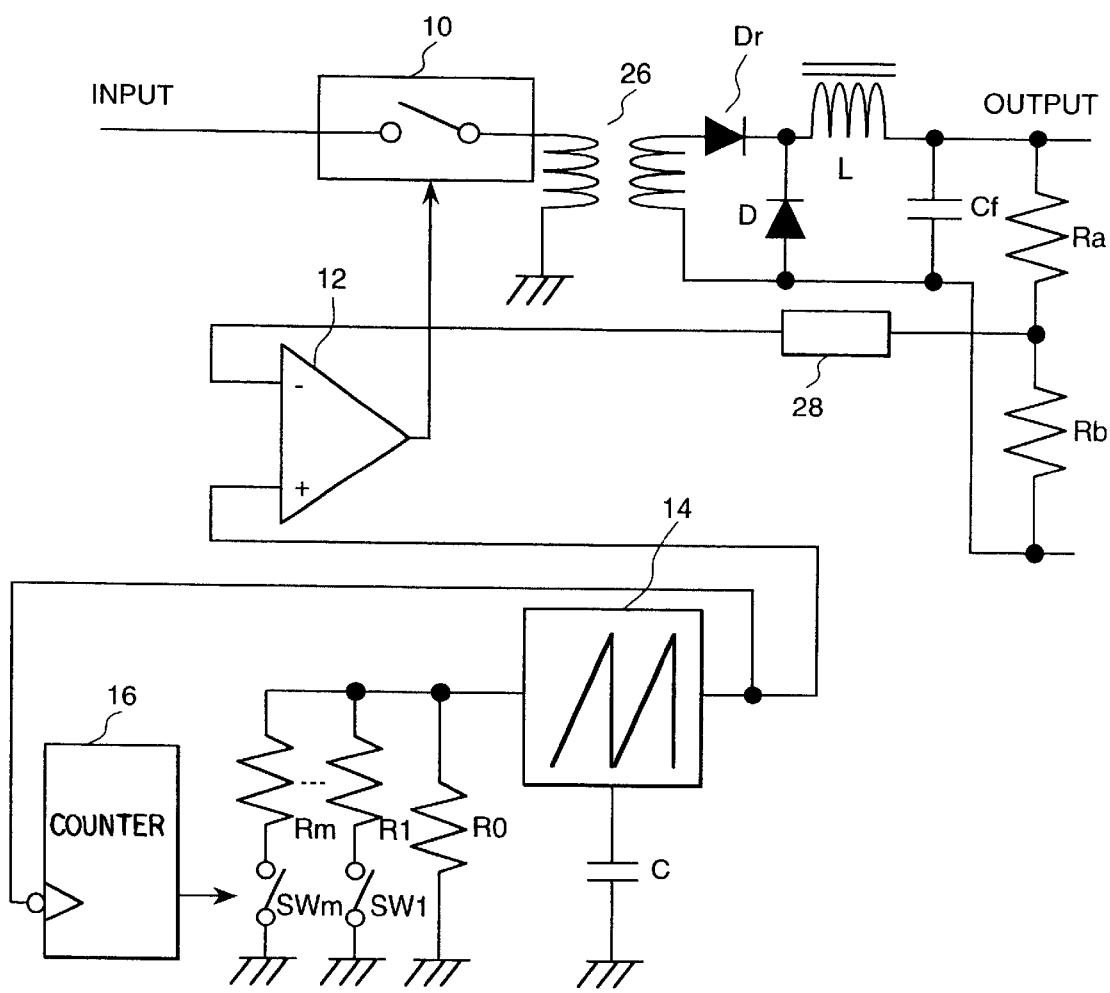
FIG. 27 is a circuit diagram representing an embodiment of an insulation type switching regulator according to the present invention.

When the present invention applies to an insulation type switching regulator, it is possible to use the configuration shown in FIG. 27 wherein a transfer 26 is inserted between the switching element 10 and reactor L; the secondary side of the transfer 26 is connected to the re actor L via the diode Dr; an isolator 28 as an insulation amplifier is inserted in the connection point between the resistors Ra and Rb; and the isolator 28 the is connected to the negative input terminal of the comparator 12.

Figure 28:
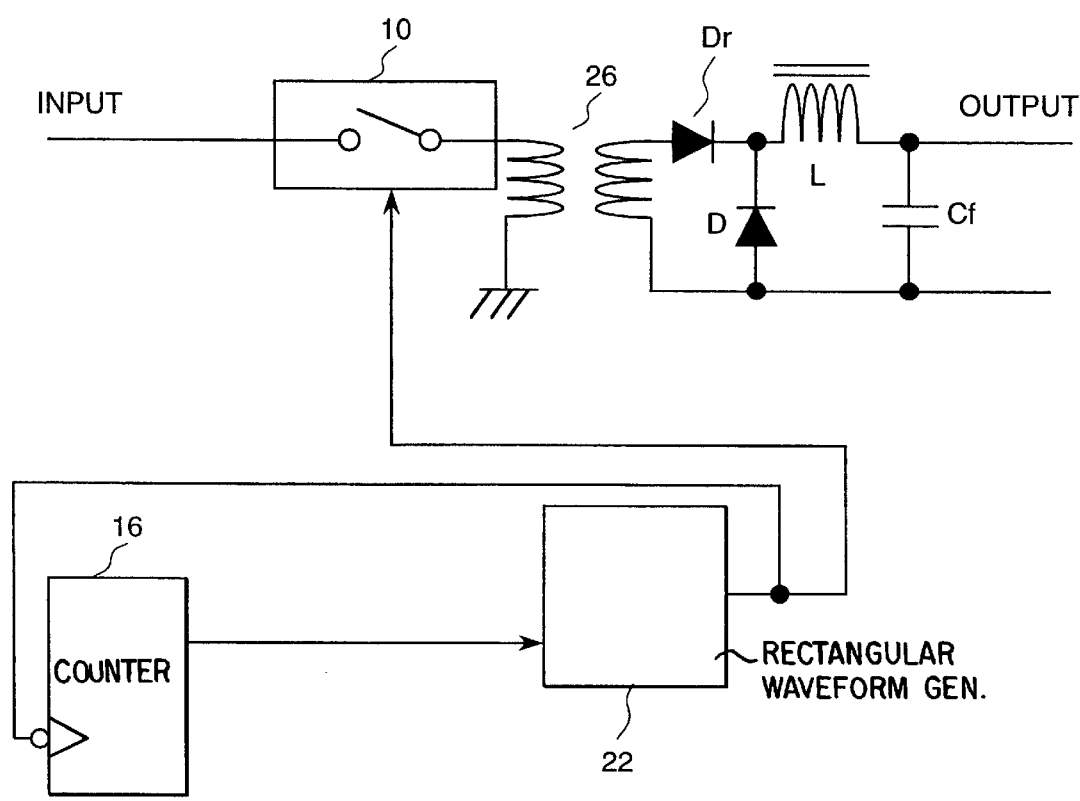
FIG. 28 is a circuit diagram representing an embodiment of an insulation type voltage converter circuit according to the present invention.

Similarly, even when the present invention is applied to the insulation type switching regulator, it can be applied to the insulation type voltage converter circuit as shown in FIG. 28 if use of a feedback system is to be eliminated.

Figure 29:
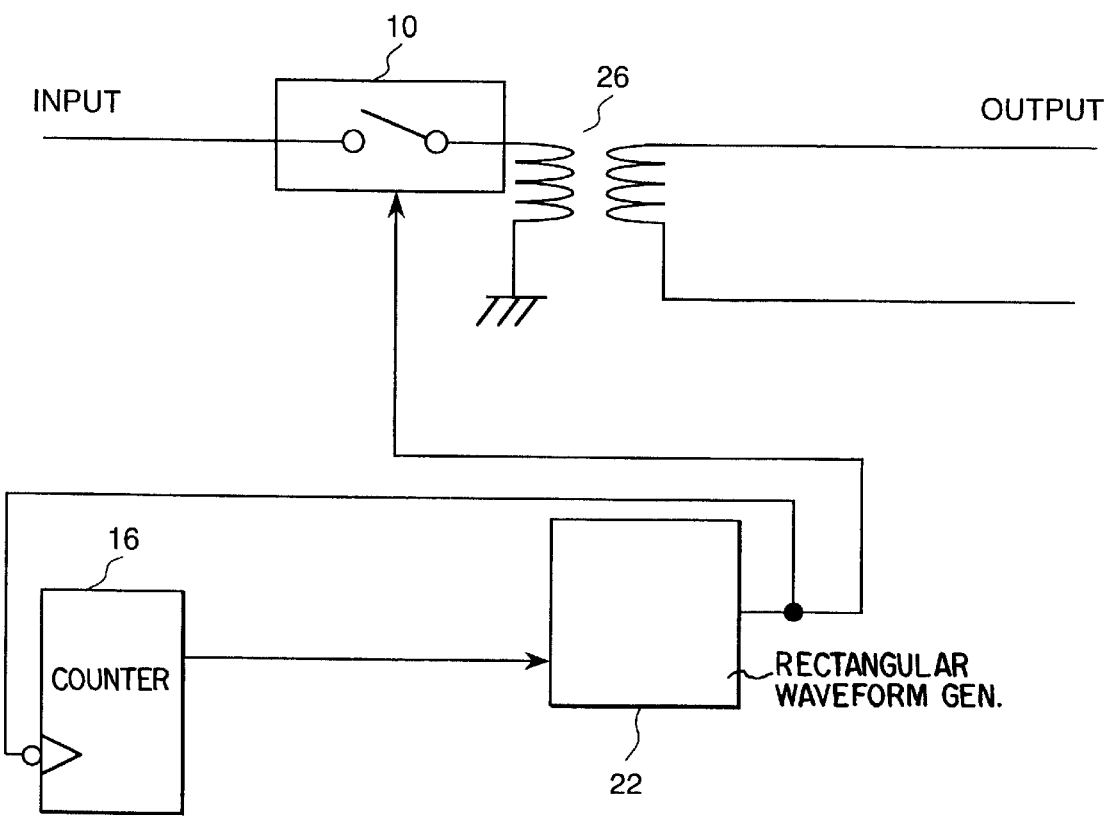
FIG. 29 is a circuit diagram representing an embodiment of a DC-AC inverter according to the present invention.

Further, the present invention can also be applied to the inverter which converts the direct current to the alternating voltage by eliminating the use of a rectifier circuit from the insulation type voltage converter circuit as shown in FIG. 29.

Figure 30:
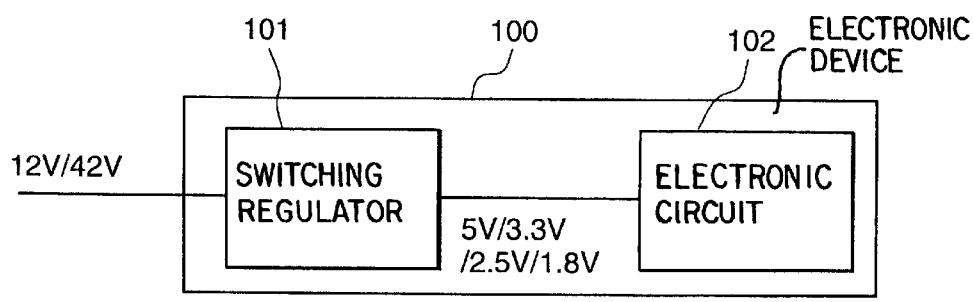
FIG. 30 is a block diagram representing an application example of a switching regulator according to the present invention.

The following describes the example of applying the switching regulator related to the present invention. FIG. 30 shows the embodiment of the electronic device 100 using the switching regulator 101. The electronic device 100 comprises the switching regulator 101 and electronic circuit 102 as the load of the switching regulator 101. The switching regulator 101 is designed to convert 12-volt (14-volt) or 42-volt d.c. voltage into 5-, 3.3-, 3.5- and 1.8-volt d.c. voltages, and is output.

The electronic circuit 102, for example, as a controlling means for controlling the car engine, automatic speed changer and brake, is designed to be operated by 5-, 3.3-, 2.5- and 1.8-volt d. c. voltages input from the switching regulator 101.

When the electronic circuit 102 and switching regulator are mounted in the prior art, series dropper type regulators are often used due to the generation of switching noise. In this case, if the input voltage of 12-volt, output voltage of 5-volt and output current of 1A are used, heat (12-5). 1=7W accompanying the power loss is generated. Amid the trend for minitualization of electronic apparatuses, such an internal heat generation raises a big problem for minitualization of electronic devices. Further, the power voltage of the car tends to be 42 volts. If the power voltage is 42 volts, heat as much as (42-5).1=37W resulting from power loss will occur. When this trend is taken into account, the switching regulator 101 of lower noise level is essential to the electronic device 100 for the control of cars.

Figure 31:
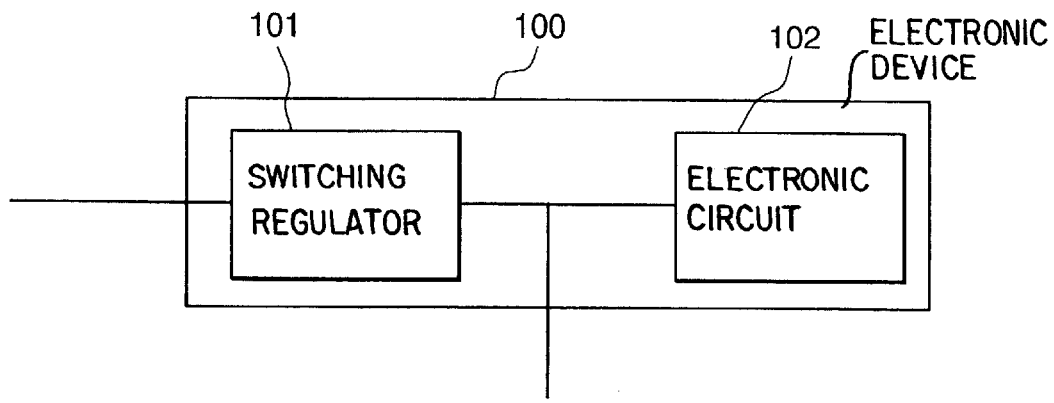
FIG. 31 is a block diagram representing another application example of a switching regulator according to the present invention.
Figure 32:
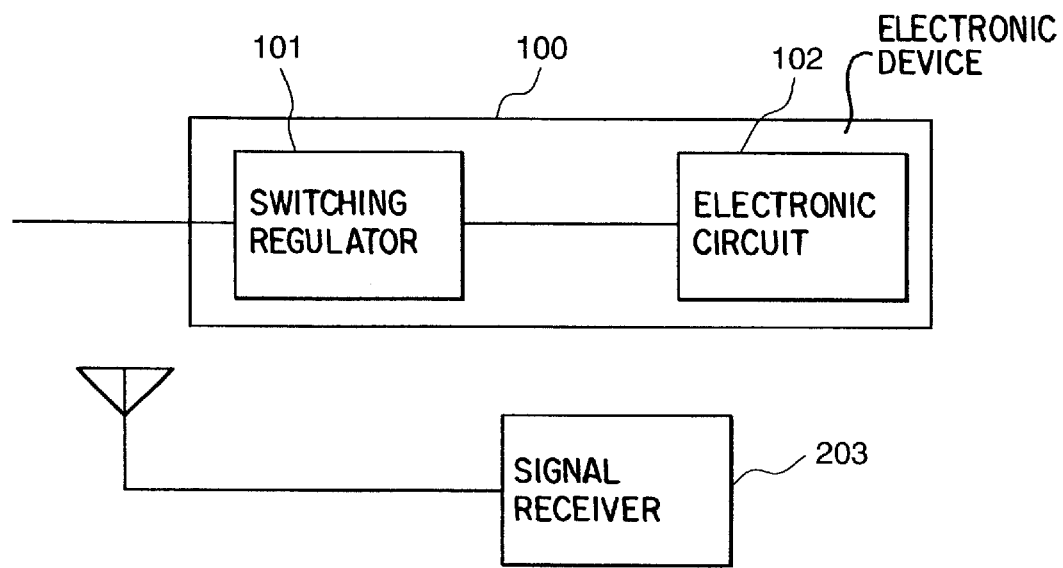
FIG. 32 is a block diagram representing still another application example of a switching regulator according to the present invention.

If use is made of the switching regulator 101 where switching noise is reduced in the simple circuit configuration, the level of the switching noise produced from the switching regulator 101 is very small when the output of the switching regulator 101 is led to the outside as power supply for an element different from the electronic circuit 102, for example, a sensor as shown in FIG. 31. This makes it possible to prevent switching noise from leaking out via the power supply line.

When a signal receiver 203 such as a radio equipment is arranged close to the electronic device 100, it is possible to reduce the harmonic wave component of switching noise mixing into the signal receiver 203 from the switching regulator 101, if the switching frequency of the switching regulator 101 is lower than the frequency of the medium wave AM broadcasting band. This allows the interference emission by switching noise to be reduced.

The above-mentioned embodiments where comparator 12, counter 16 and sawtooth wave generator 14 are made up of digital circuits can be produced in a smaller space. Their circuit configuration is especially suited for formation of an integrated circuit.

As described above, the present invention allows the peak of the switching noise to be diffused in the frequency range, and noise energy to be diffused, thereby ensuring a stable reduction of noise level at all times.

What is claimed is:

1. An electric power converter comprising:
    a signal generator for generating multiple signals having different frequencies,
    a signal selecting means for selecting signals of specified frequency from said multiple signals and outputting said signals sequentially in a predetermined order when an output voltage from said signal generator changes,
    a switching element for switching input voltage in response to signals selected by said signals electing means, and
    a filter circuit for smoothing the output voltage of said signal generator.

2. An electric power converter according to claim 1 wherein multiple signals generated from said signal generator are signals of rectangular waves having different periods.

3. An electric power converter comprising:
    a switching element for switching input voltage in response to switching signals,
    a filter circuit for smoothing the output voltage of said switching element,
    a signal generator for generating multiple signals having different frequencies,
    a signal selecting means for selecting signals of specified frequency from said multiple signals and outputting said signals sequentially in a predetermined order when an output voltage from said signal generator changes, and
    a comparator which compares between signals selected by said signal selecting means and feedback signals obtained from the output voltage of said filter circuit, thereby generating switching signals and outputting them to said switching element.

4. An electric power converter according to claim 3 wherein multiple signals generated from said signal generator are the signals characterized by waveforms having a certain tilt.

5. An electric power converter according to claim 3 wherein multiple signals generated from said signal generator are the signals characterized by sawtooth waveforms.

6. An electric power converter according to claim 3 wherein multiple signals generated from said signal generator are the signals characterized by triangular waveforms.

7. An electric power converter according to claim 4, wherein said signal selecting means selects the signals generated from said signal generator according to the vertex of the waveform.

8. An electric power converter according to claim 1, wherein said signal selecting means repeats the step of selecting out of the signals in the order from higher to lower frequencies.

9. An electric power converter according to claim 3 wherein said signal generator and said signal selecting means comprise:
    a waveform generator for generating signals of triangular waveform and sawtooth waveform,
    a time constant circuit for determining the period of the signals generated from said waveform generator according time constant,
    multiple resistors for changing said time constant,
    a counter which counts the signals generated from said waveform generator, compares the counted value with the preset value and outputs the switching signals synchronously with the vertex of the waveform of said signals based on the compared result, and
    multiple switch for adding the specified ones of said multiple resistors to said time constant circuit in response to said switching signals.

10. An electric power converter according to claim 3 wherein said signal generator and said signal selecting means comprise:
    a waveform generator for generating signals of triangular waveform and sawtooth waveform,
    a time constant circuit for determining the period of the signals generated from said waveform generator according time constant,
    multiple resistors for changing said time constant,
    a random number generator for outputting the switching signals synchronously with the vertex of the waveform of the signals generated from said waveform generator, and
    multiple switch for adding the specified ones of said multiple resistors to said time constant circuit in response to said switching signals.

11. An electric power converter according to claim 9 wherein said counter is a binary counter.

12. An electric power converter according to claim 9 wherein said waveform generator, said comparator, said multiple switches and said counter are arranged on a single semiconductor chip.

13. An electric power converter according to claim 9 or 11 wherein said waveform generator, said comparator, said multiple resistors, said multiple switches and said counter are arranged on a single semiconductor chip.

14. An electric power converter according to claim 10 wherein said wave form generator, said comparator, said multiple switches and said random number generator are arranged on a single semiconductor chip.

15. An electric power converter according to claim 10 wherein said wave form generator, said comparator, said multiple resistors, said multiple switches and said random number generator are arranged on a single semiconductor chip.

16. An electric power converter according to claim 9, wherein said multiple resistors and said multiple switches are each connected in series, and resistors and switches connected in series are each connected with others in parallel.

17. An electric power converter according to claim 16 wherein the resistance of each of said resistors is different from the parallel combined resistance of other resistors connected in parallel.

18. An electric power converter according to claim 17 wherein the resistance Ri of each of said resistors has a relation of $Ri = Kr \cdot 2^{-i}$.

19. An electric power converter according to claim 2 wherein said signal generator consists of a frequency divider for dividing the original frequency.

20. An electric power converter according to claim 1, wherein a transformer is provided between said switching element and said filter circuit.

21. An electric power converter according to claim 1, wherein said filter circuit has a reactor and capacitor, one end of said reactor is connected to the input side, and the other end of said reactor is connected to the ground via said capacitor as well as via said switching element.

22. An electronic apparatus wherein an electric power converter according to claim 1, and an electronic circuit to be operated by power received from said electric power converter.

23. An electronic apparatus according to claim 22 wherein the output of said electric power converter is led outside as a power source of the element different from said electronic circuit.

24. An electronic apparatus according to claim 22 wherein the output of said electric power converter is arranged in the vicinity of a receiving apparatus.

25. An electronic apparatus according to claim 22 wherein said electronic circuit has a control means for controlling any one of a car engine, automatic changer and brake.

26. A car comprising an electronic apparatus according to claim 25.

* * * * *